United States Patent
Nojima et al.

(10) Patent No.: US 9,037,652 B2
(45) Date of Patent: May 19, 2015

(54) NETWORK CONTROL SYSTEM

(75) Inventors: Akira Nojima, Kunitachi (JP); Yuuji Umeda, Tachikawa (JP)

(73) Assignees: TOSHIBA MITSUBISHI-ELECTRIC INDUSTRIAL SYSTEMS CORPORATION, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 1213 days.

(21) Appl. No.: 12/810,577

(22) PCT Filed: Dec. 25, 2007

(86) PCT No.: PCT/JP2007/074799
§ 371 (c)(1),
(2), (4) Date: Sep. 27, 2010

(87) PCT Pub. No.: WO2009/081479
PCT Pub. Date: Jul. 2, 2009

(65) Prior Publication Data
US 2011/0047218 A1    Feb. 24, 2011

(51) Int. Cl.
  G06F 15/16    (2006.01)
  G05B 19/418   (2006.01)

(52) U.S. Cl.
  CPC  G05B 19/41855 (2013.01); *G05B 2219/31124* (2013.01)

(58) Field of Classification Search
  USPC ........................................................ 709/205
  See application file for complete search history.

(56) References Cited

U.S. PATENT DOCUMENTS

| 5,398,243 | A  | * | 3/1995 | Aguilhon et al. | 370/438 |
| 6,598,108 | B1 | * | 7/2003 | Ashida et al.   | 710/305 |
| 6,941,175 | B2 | * | 9/2005 | Amrhein et al.  | 700/23  |
| 2006/0079966 | A1 | * | 4/2006 | Ashida et al.   | 700/14 |
| 2007/0147232 | A1 | * | 6/2007 | Takehara et al. | 370/217 |

FOREIGN PATENT DOCUMENTS

| JP | 5 336118   | 12/1993 |
| JP | 7-283818   | 10/1995 |
| JP | 2005 094289 | 4/2005 |

OTHER PUBLICATIONS

Office Action issued on Apr. 10, 2012 in the corresponding Japanese Application No. 2009-546895 (with English Translation).

* cited by examiner

*Primary Examiner* — June Sison
(74) *Attorney, Agent, or Firm* — Oblon, McClelland, Maier & Neustadt, L.L.P.

(57) ABSTRACT

First and second stations have first and second memory elements (2, 3) for storing first and second shared data, respectively, and a data transfer system (DT1) includes third and fourth memory elements (CM 12, CM 14) for storing third and fourth shared data, respectively, first and second transfer period determiner (CNT 90, CNT 92), a first transfer element (26a) working to operate in accordance with the first transfer period to have the second shared data stored in the fourth memory element (CM 14) and operate in accordance with the second transfer period to have the first shared data stored in the third memory element (CM 12), a second transfer element (26b) working for transfer of shared data between the fourth memory element (CM 14) and the third memory element (CM 12), and a third transfer element (26c) working to operate in accordance with the second transfer period to have the fourth shared data stored in the second memory element (3) and operate in accordance with the first transfer period to have the third shared data stored in the first memory element (2).

16 Claims, 19 Drawing Sheets

FIG. 1
(a)
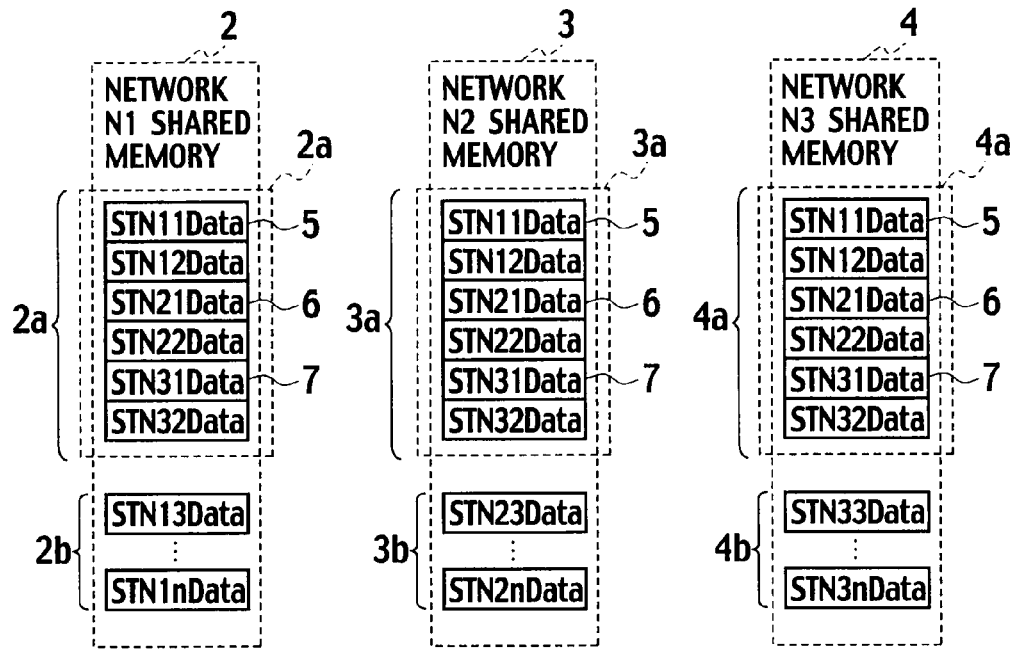
(b)
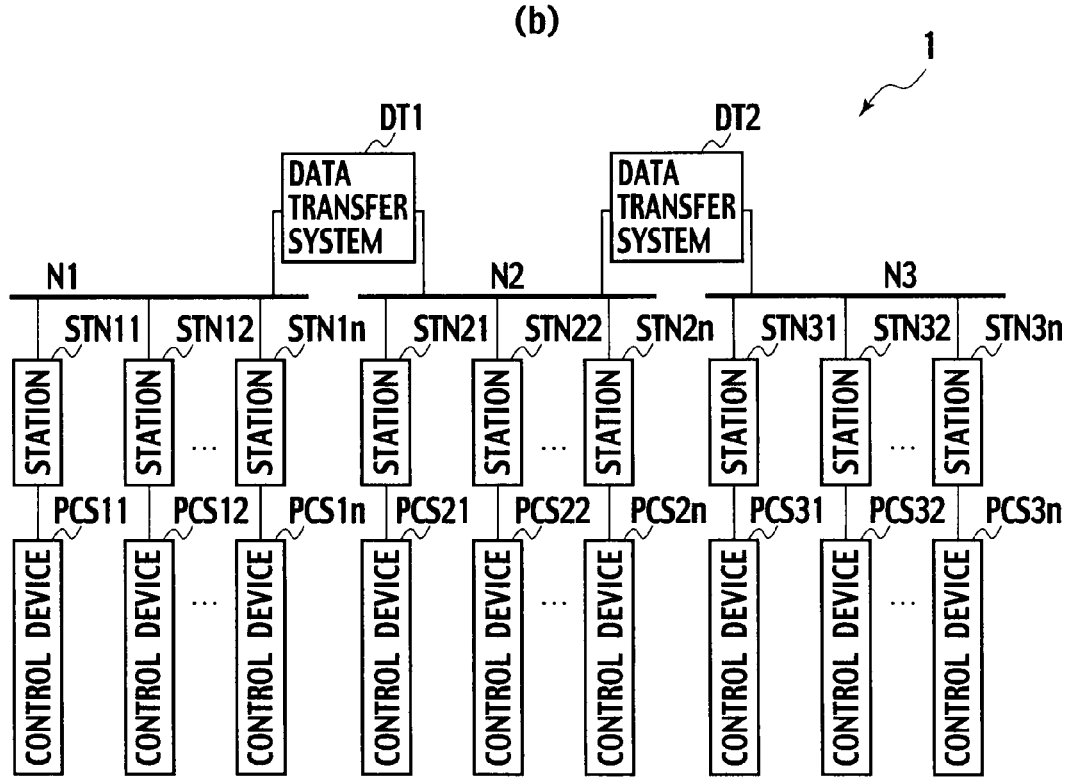

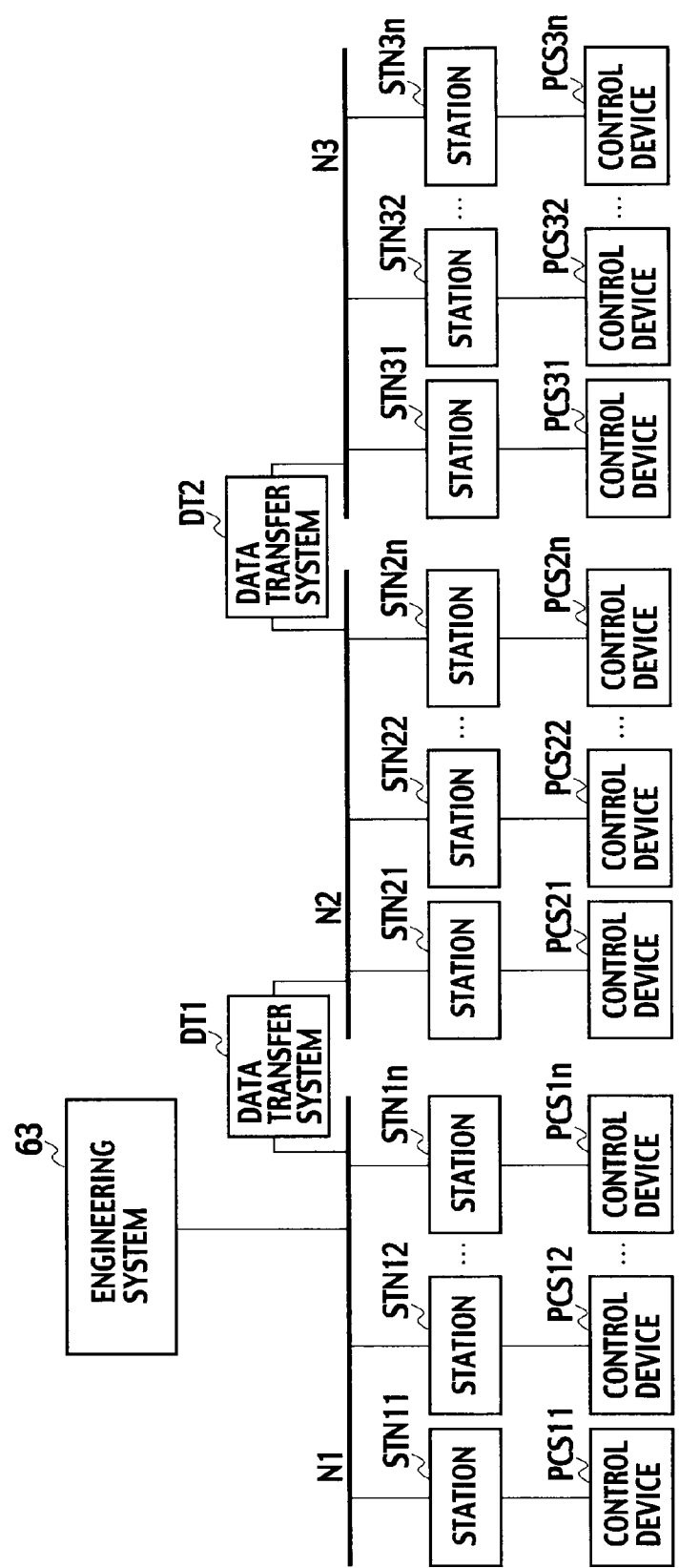

FIG. 10

| Address | Memory Type |
|---|---|
| 00000000 | LOCAL COMMON MEMORY |
| 00000010 | LOCAL COMMON MEMORY |
| 00000020 | GLOBAL COMMON MEMORY |
| 00000030 | GLOBAL COMMON MEMORY |
| 00000040 | GLOBAL COMMON MEMORY |
| 00000050 | GLOBAL COMMON MEMORY |
| 00000060 | GLOBAL COMMON MEMORY |
| 00000070 | LOCAL COMMON MEMORY |
| 00000080 | GLOBAL COMMON MEMORY |
| 00000090 | LOCAL COMMON MEMORY |
| 000000A0 | LOCAL COMMON MEMORY |
| 000000B0 | GLOBAL COMMON MEMORY |
| 000000C0 | GLOBAL COMMON MEMORY |
| 000000D0 | GLOBAL COMMON MEMORY |
| 000000E0 | LOCAL COMMON MEMORY |
| 000000F0 | GLOBAL COMMON MEMORY |
| 00000100 | LOCAL COMMON MEMORY |
| 00000110 | GLOBAL COMMON MEMORY |
| 00000120 | GLOBAL COMMON MEMORY |
| 00000130 | GLOBAL COMMON MEMORY |
| 00000140 | LOCAL COMMON MEMORY |
| 00000150 | GLOBAL COMMON MEMORY |
| 00000160 | LOCAL COMMON MEMORY |
| 00000170 | |
| ⋮ | ⋮ |
| FFFFFFFF | LOCAL COMMON MEMORY |

NETWORK CONTROL SYSTEM

TECHNICAL FIELD

The present invention relates to a network control system widely used for control of industrial systems, such as those in, among others, iron and steel making plants or paper making plants, FA fields including assembly operations such as in automobile industries, PA fields such as for chemical plants, or water supply and sewerage systems or other public systems.

BACKGROUND ART

For control of plant equipments, there have been typical plant control systems including those configured with control devices interconnected through a network to implement data transfer between control devices via the network. Also, there have been plant control systems for large-scale plants, including those configured with control devices increased in number and accompanied by a set of superordinate networks hierarchically architected to implement data transfer between networks.

Still also, there has been use of a set of sub-network repeaters described in a patent literature 1 (Japanese Patent Application Laying-open Publication No. 5-336118), for instance, to constitute a plant control system.

FIG. 18 is a conceptual diagram showing a concept of data transfer in a plant control system in the past.

As shown in FIG. 18, the plant control system 100 in the past had data transfer systems DT104, DT105, and DT106 interconnected through a network N110. The data transfer system DT104 was connected through a sub-network N101 to n sub-network stations STN111 to STN11n. Likewise the data transfer system DT105 was connected through a sub-network N102 to n sub-network stations STN121 to STN12n, and the data transfer system DT106 was connected through a sub-network N103 to n sub-network stations STN131 to STN13n.

The n sub-network stations STN111 to STN11n were connected with n control devices PCS111 to PCS11n, respectively. Likewise the n sub-network stations STN121 to STN12n were connected with n control devices PCS121 to PCS12n, respectively, and the n sub-network stations STN131 to STN13n were connected with n control devices PCS131 to PCS13n, respectively.

There was combination of a memory shared to be common in sub-network 101 for STN11Data to STN1nData to be defined, a memory shared to be common in sub-network 102 for STN21Data to STN2nData to be defined, and a memory shared to be common in sub-network 103 for STN31Data to STN3nData to be defined.

In such the configuration, for transfer of data between a certain sub-network and any sub-network else, implemented was a transfer of data through network 110 using data transfer systems DT104, DT105, and/or DT106.

For instance, as illustrated in FIG. 18, for pieces of data STN11Data and STN12Data in the memory shared in the sub-network N101 to be used at a control device PCS121 connected to the sub-network N 102, there was an operation of the data transfer system DT104 to have the pieces of data STN11Data and STN12Data in the shared memory in the sub-network N101 once transferred through the superordinate network N110 to the data transfer system DT105. Then, the data transfer system DT105 was operated, so that the transferred data STN and STN12Data of shared memory were transferred to sub-network stations STN121 to STN12n, as pieces of data to be shared under the sub-network N102.

SUMMARY OF INVENTION

However, the plant control system in the past had four problems, as follows.

As a first problem, there was an increase in cost of fabrication as well as in cost of maintenance due to complexity of system configuration. That is, for transfer of data between sub-networks, there was needed provision of data transfer systems DT104, DT105, and DT106 and a superordinate network N 110, with an increased cost in fabrication of plant control system. Further, as a problem in an entirety of plant control system, there was a failure rate increased as the system number increased, with increased expenses for the maintenance.

As a second problem, there was a decrease in transfer rate of data. That is, for any piece of data in shared memory in an individual sub-network to be used in another network, it was necessitated to have the data of shared memory in the sub-network once transferred via a route for data transfer to a superordinate network N110, and make an additional transfer of data of shared memory through a data transfer system to a sub-network connected to a control device needing the data of shared memory. As a result, the data transfer rate was reduced, as a problem.

In the example illustrated in FIG. 18, for use of data STN11Data and STN12Data in shared memory in a sub-network N101 being wanted at a control device PCS21 connected to a sub-network N102, there was operation of a data transfer system DT104 to transfer the sub-network N101's shared memory data STN11Data and STN12Data once to a data transfer system DT105, via a superordinate network N110, as described. This was followed by operation of the data transfer system DT105, as necessary for the transferred shared memory data STN11Data and STN12Data to be transferred to sub-network stations STN121 to STN12n, as data to be shared in the sub-network N102. Hence, sometimes there appeared reduction of data transfer rate.

As a third problem, there was transfer of data not always optimum, such as disabled transfer of latest data to sub-networks, or repeated transfer of identical data.

FIG. 19 is a time chart showing data transfer timings for transfer of data from a sub-network to another sub-network.

As illustrated in FIG. 19, there was a transfer period 101a as a period of transfer in the sub-network N101, there being a transfer period 102a as a period of transfer in the sub-network N102, and a transfer period 100a as a period of transfer between sub-networks.

First, the data transfer system DT104 was operated at a transfer timing according to the transfer period 101a, to transfer one of data 101e to 101i to be transferred to sub-network stations STN111 to STN11n connected to the sub-network N101.

Then, at a time t1, the data transfer system DT104 received a transfer data 102f transferred from the data transfer system DT105 through the superordinate network N110, in accordance with the transfer period 100a. Further, at a time t2, the data transfer system DT104 was operated for a transfer of transfer data 101f according to the transfer period 101a, which was followed by its operation to transfer the received transfer data 102f to the sub-network stations STN111 to STN11n.

Next, at a time t3, the data transfer system DT104 was operated for a transfer of transfer data 101g according to the transfer period 101a, which was followed by its operation to transfer the received transfer data 102f again to the sub-network stations STN111 to STN11n.

Such being the case, there was a difference between the transfer period 100a and the transfer period 101a, causing the data transfer system DT104 to transfer the transfer data 102f twice to the sub-network stations STN111 to STN11n.

Next, at a time t4, the data transfer system DT104 received a transfer data 102g transferred from the data transfer system DT105 through the superordinate network N110, in accordance with the transfer period 100a.

Then, at a time t5, the data transfer system DT104 was operated for a transfer of transfer data 101h according to the transfer period 101a, which was followed by its operation to transfer the received transfer data 102g to the sub-network stations STN111 to STN11n.

Such being the case, due to the difference between the transfer period 100a and the transfer period 101a, the data transfer system DT104 was subject to a difference between a time interval (t1 to t2) from reception to transfer of the transfer data 102f and a time interval (t4 to t5) from reception to transfer of the transfer data 102g. It was thus not always a latest transfer data from the data transfer system DT105 that was transferred to the sub-network stations STN111 to STN11n.

Such being the case, sometimes there appeared un-optimized data among transferred data from the data transfer system DT105 to the sub-network stations STN111 to STN11n.

Likewise, sometimes there appeared un-optimized data among transferred data from the data transfer system DT104 to sub-network stations STN121 to STN12n, too.

As a fourth problem, there was a complicate processing due to mismatched addresses in shared memories. That is, for identical data in the plant control system in the past, there was a discrepancy between a shared memory address in the superordinate network N110 and a shared memory address in a respective sub-network. Also, for identical data, there were mismatched addresses in shared memories even between sub-networks. As a result, there were overly complicated engineering tasks, such as those in data transfer setup in plant control system.

In the example illustrated in FIG. 18, there were data STN11Data and STN12Data of shared memory in the sub-network N101 transferred through the data transfer system DT104 to the superordinate network N110, with addresses of shared memory data STN11Data and STN12Data on the sub-network N101 being mismatched to addresses of shared memory data STN11Data and STN12Data on the superordinate network N110. The addresses of shared memory data STN11Data and STN12Data on the sub-network N101 were mismatched to addresses of shared memory data STN11Data and STN12Data on the sub-network N102, too. As a result, there were complicated engineering tasks, such as those in data transfer setup in plant control system, giving rise to significant task loads on workers.

The present invention has been devised in view of the problems described, and it is an object of the present invention to provide a network control system with a simplified system configuration leading to a reduced cost, allowing for an enhanced efficiency in network transfer, an optimized transfer data, and a facilitated engineering.

BRIEF DESCRIPTION OF DRAWINGS

FIG. 1(a) is an explanatory diagram showing internal configurations of shared memories in a network control system according to a first embodiment of the present invention, and FIG. 1(b) is a configuration diagram showing a system configuration of the network control system according to the first embodiment of the present invention.

FIG. 9 is a configuration diagram showing a system configuration of a network control system 1c according to a third embodiment.

FIG. 10 is an explanatory diagram showing an example of global shared memory area set up with memory areas according to shared setting information.

DESCRIPTION OF EMBODIMENTS

Figure 2:
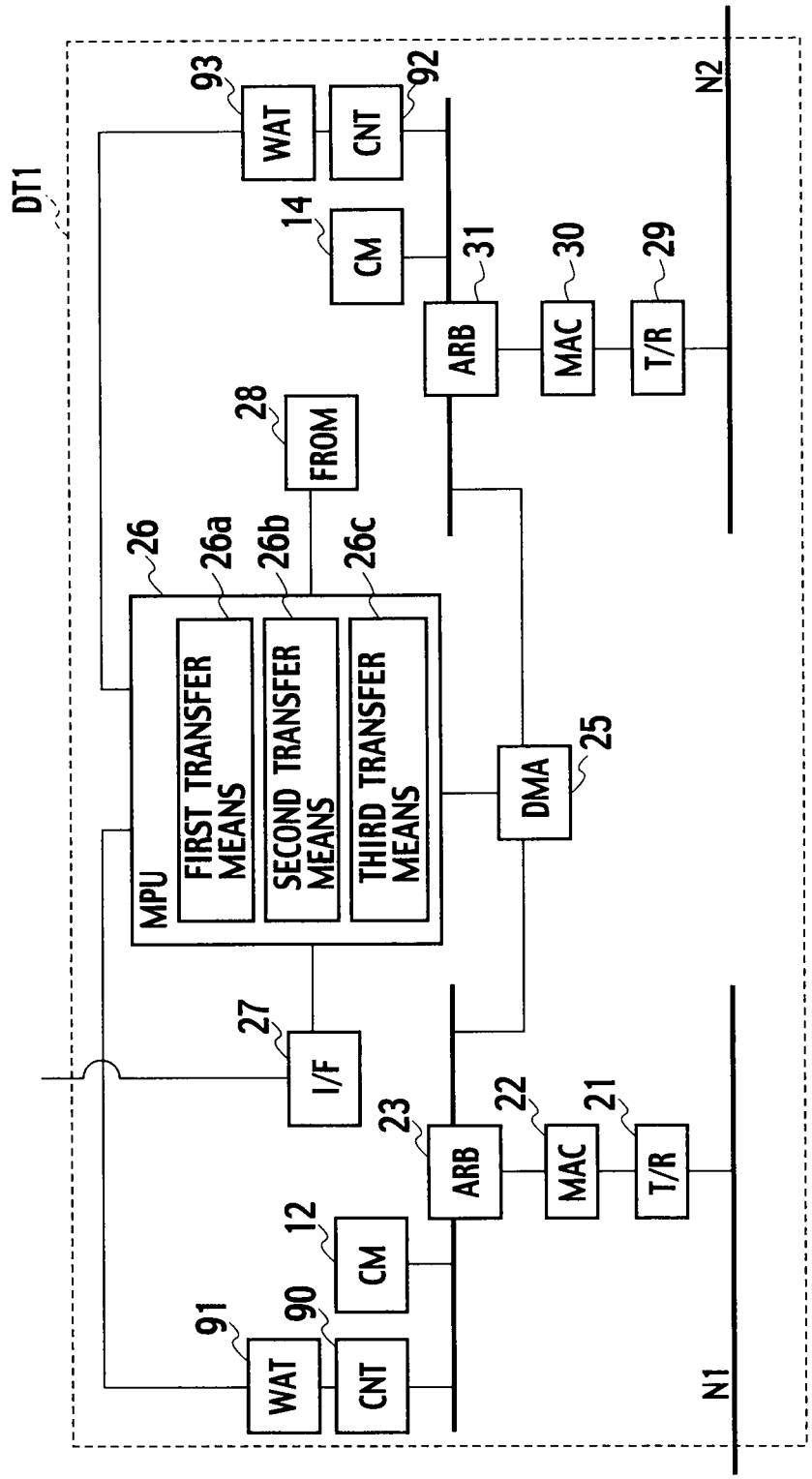
FIG. 2 is a configuration diagram showing a hardware configuration of a data transfer system DT1 in the network control system 1 according to the first embodiment.

There will be description of embodiments with reference to drawings.

<First Embodiment>

FIG. 1(a) is an explanatory diagram showing internal configurations of shared memories in a network control system according to a first embodiment of the present invention, and FIG. 1(b) is a configuration diagram showing a system configuration of the network control system according to the first embodiment of the present invention.

As shown in FIG. 1(b), the network control system 1 according to the first embodiment includes a data transfer system DT1, a data transfer system DT2, a set of n stations STN11 to STN1n, a set of n stations STN21 to STN2n, and a set of n stations STN31 to STN3n. The data transfer system DT1 and stations STN11 to STN1n are interconnected through a network N1. Between the data transfer system DT1 and stations STN21 to STN2n, as well as between the data transfer system DT2 and the stations STN21 to STN2n, there are interconnections through a network N2. The data transfer system DT2 and stations STN31 to STN3n are interconnected through a network N3.

Further, the network control system 1 includes a set of n control devices PCS11 to PCS1n connected with stations under the network N1, respectively, a set of n control devices PCS21 to PCS2n connected with stations under the network N2, respectively, and a set of n control devices PCS31 to PCS3n connected with stations under the network N3, respectively.

As shown in FIG. 1(a), the network N1 has a shared memory 2 configured as illustrated, the stations STN11 to STN1n as well as the data transfer system DT1 being each provided with a shared memory similar thereto in configuration. The network N2 has a shared memory 3 configured as illustrated, the stations STN21 to STN2n as well as the data transfer system DT1 and the data transfer system DT2 being each provided with a shared memory similar thereto in configuration. The network N3 has a shared memory 4 configured as illustrated, the stations STN31 to STN3n as well as the data transfer system DT2 being each provided with a shared memory similar thereto in configuration.

The shared memory 2 of network N1, the shared memory 3 of network N2, and the shared memory 4 of network N3 have areas thereof each divided into an area set up as (a global shared memory area 2a, 3a, or 4a) being sharable to be common among the networks N1, N2, and N3, and an area set up as (a local shared memory area 2b, 3b, or 4b) being effective simply within the network N1, N2, or N3, respectively. The global shared memory areas have sets of data stored therein each having an identical address over the shared memories of networks N1, N2, and N3.

FIG. 2 is a configuration diagram showing a hardware configuration of the data transfer system DT1 in the network control system 1 according to the first embodiment. It is noted that the data transfer system DT2 is similar in configuration to the data transfer system DT1, and description thereof is omitted.

As shown in FIG. 2, in the network control system 1 according to the first embodiment, the data transfer system DT1 includes a combination of T/R's 21 and 29 configured as transmitter receiver sets, a combination of MAC's 22 and 30 configured as medium access controllers, a combination of ARB's 23 and 31 configured as bus traffic arbitrators, a CM 12 configured as a common memory shared in the network N1, a CM 14 configured as a common memory shared in the network N2, a DMA 25, an MPU 26 configured for central control, an I/F 27 configured as a transfer parameter in-taking interface, an FROM 28 configured as a transfer parameter memory, a combination of CNT's 90 and 92 configured as transfer controllers, and a combination of WAT's 91 and 93 configured as transfer period monitors.

The CM 12 is divided, like the shared memory 2 illustrated in FIG. 1(a), into an area set up as (a global shared memory area 12a) being shamble to be common among the networks N1 to N3, and an area set up as (a local shared memory area 12b) being effective simply within the network N1.

Also the CM 14 is divided, like the shared memory 3 illustrated in FIG. 1(a), into an area set up as (a global shared memory area 14a) being shamble to be common among the networks N1 to N3, and an area set up as (a local shared memory area 14b) being effective simply within the network N2.

The CNT 90 is configured to determine a first transfer period as a transfer period in transfer of shared data from the data transfer system DT1 to stations STN11 to STN1n.

The WAT 91 is configured to work in accordance with the first transfer period determined by the CNT 90, to detect a time point of transfer of shared data from the data transfer system DT1 to stations STN11 to STN1n, as a second transfer timing. Further, the WAT 91 is configured to detect a time point of reception of shared data from any of stations STN21 to STN2n to the data transfer system DT1, as a first transfer timing to be a time point earlier than the second transfer timing by a prescribed time interval. And, the WAT 91 is adapted to work upon detection of the first transfer timing or the second transfer timing, to supply the MPU 26 with a signal representing the detection.

The CNT 92 is configured to determine a second transfer period as a transfer period in transfer of shared data from the data transfer system DT1 to stations STN21 to STN2n.

The WAT 93 is configured to work in accordance with the second transfer period determined by the CNT 92, to detect a time point of transfer of shared data from the data transfer system DT1 to stations STN21 to STN2n, as a fourth transfer timing. Further, the WAT 93 is configured to detect a time point of reception of shared data from any of stations STN11 to STN1n to the data transfer system DT1, as a third transfer timing to be a time point earlier than the fourth transfer timing by a prescribed time interval. And, the WAT 93 is adapted to work upon detection of the third transfer timing or the fourth transfer timing, to supply the MPU 26 with a signal representing the detection.

Further, the FROM 28 has stored therein pieces of information on shared memories as targets of global shared memories on the networks. More specifically, the FROM 28 has stored therein sets of addresses of global memory areas and directions data transfer associated therewith, as information on shared memories.

Such pieces of information on shared memories are stored in the FROM 28 from an external interface, through the I/F 27 configured as a transfer parameter in-taking interface, and the MPU 26. Also, there may be pieces of information on shared memories taken in as targets of global shared memories, through the network N1 or the network N2.

Functionally, the MPU 26 is configured with a first transfer means 26a, a second transfer means 26b, and a third transfer means 26c. And, the first transfer means 26a, the second transfer means 26b, and the third transfer means 26c are each adapted to read pieces of information on global shared memories in the FROM 28, to make the following control actions in accordance with read information on setting.

At the MPU 26, the first transfer means 26a is adapted to operate in accordance with a first transfer period determined by the CNT 90, to have pieces of shared data as stored in global shared memory areas of stations STN21 to STN2n, stored in a global shared memory area of the CM 14, with addresses identical to their addresses in those global shared memory areas.

More specifically, the first transfer means 26a operates, at a first transfer timing, to store in the CM 14 those pieces of shared data received from the network N2, by employing the T/R 29, the MAC 30, and the ARB 31.

Further, at the MPU 26, the first transfer means 26a is adapted to operate in accordance with a second transfer period determined by the CNT 92, to have pieces of shared data as stored in global shared memory areas of stations STN11 to STN1n, stored in a global shared memory area of the CM 12, with addresses identical to their addresses in those global shared memory areas.

More specifically, the first transfer means 26a operates, at a third transfer timing, to store in the CM 12 those pieces of shared data received from the network N1, by employing the T/R 21, the MAC 22, and the ARB 23.

At the MPU 26, the second transfer means 26b is adapted to operate, as the CM 12 has pieces of shared data stored in the global shared memory area by the first transfer means 26a, to store the pieces of shared data in the global shared memory area of the CM 14, with addresses identical to their addresses in the global shared memory area of the CM 12.

More specifically, the second transfer means 26b operates to have pieces of shared data as stored in the global shared memory area of the CM 12, stored in the global shared memory area of the CM 14, by employing the ARB 23, the DMA 25, and the ARB 31.

Further, at the MPU 26, the second transfer means 26b is adapted to operate, as the CM 14 has pieces of shared data stored in the global shared memory area by the first transfer means 26a, to store the pieces of shared data in the global shared memory area of the CM 12, with addresses identical to their addresses in the global shared memory area of the CM 14.

More specifically, the second transfer means 26b operates to have pieces of shared data as stored in the global shared memory area of the CM 14, stored in the global shared memory area of the CM 12, by employing the ARB 31, the DMA 25, and the ARB 23.

At the MPU 26, the third transfer means 26c is adapted to operate in accordance with a second transfer period supplied from the WAT 93, to have pieces of shared data as stored in the global shared memory area of the CM 14, stored in global shared memory areas of stations STN21 to STN2n, with addresses identical to their addresses in the global shared memory area of the CM 14.

More specifically, the third transfer means 26c operates, at a fourth transfer timing, to have pieces of shared data as stored in the global shared memory area of the CM 14, stored in the global shared memory areas of stations STN21 to STN2n, by employing the ARB 31, the MAC 30, and the UR 29.

Further, at the MPU 26, the third transfer means 26c is adapted to operate in accordance with a first transfer period supplied from the WAT 91, to have pieces of shared data as stored in the global shared memory area of the CM 12, stored in global shared memory areas of stations STN11 to STN1n, with addresses identical to their addresses in the global shared memory area of the CM 12.

More specifically, the third transfer means 26c operates, at a second transfer timing, to have pieces of shared data as stored in the global shared memory area of the CM 12, stored in the global shared memory areas of stations STN11 to STN1n, by employing the ARB 23, the MAC 22, and the T/R 21.

Figure 3:
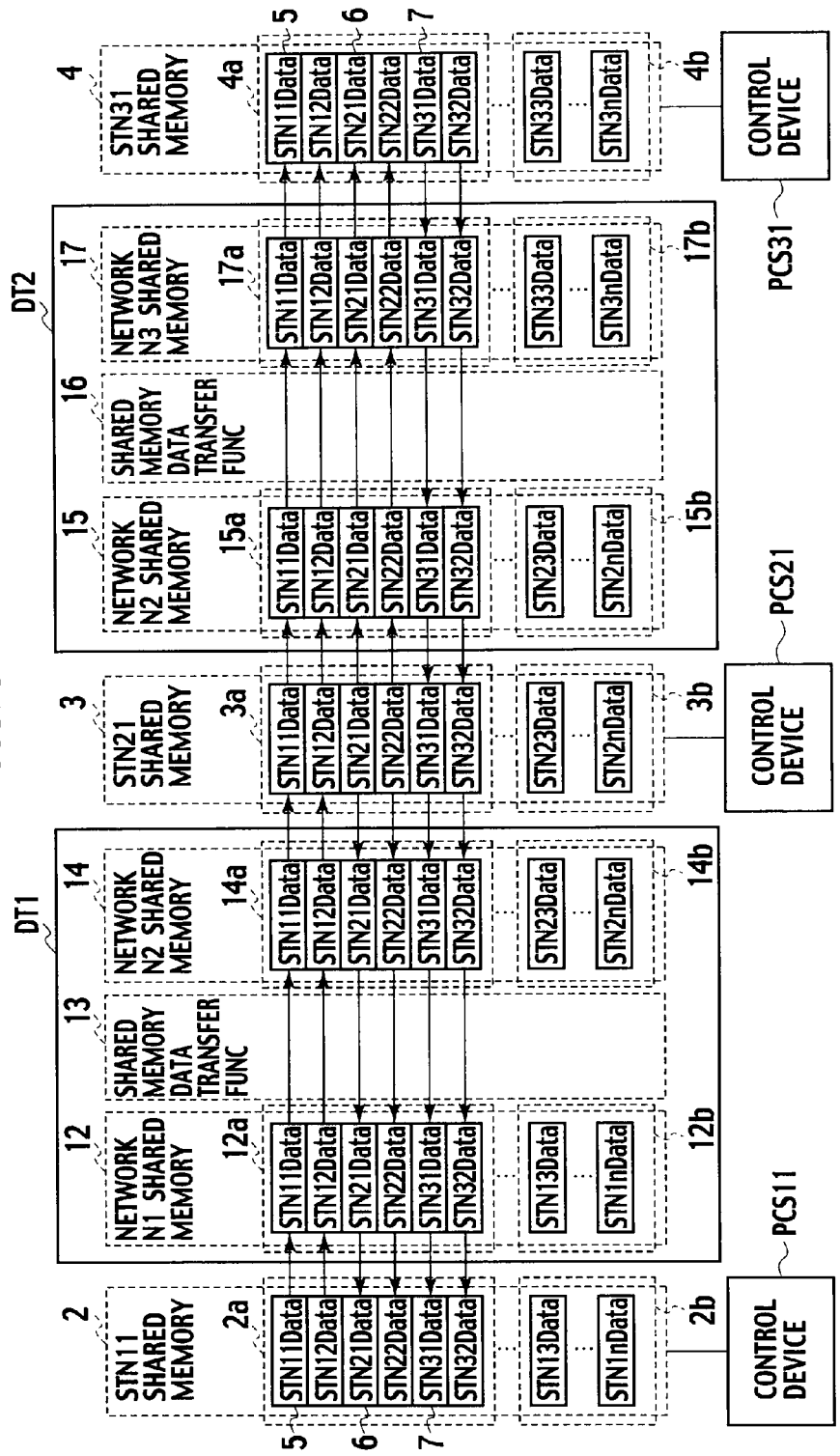
FIG. 3 is a diagram describing data transfer of shared data among networks N1, N2, and N3 in the network control system 1 according to the first embodiment of the present invention.

Description is now made of actions of the network control system 1 according to the first embodiment of the present invention, with reference to FIG. 3.

FIG. 3 is a diagram describing data transfer of shared data among networks N1, N2, and N3 in the network control system 1 according to the first embodiment of the present invention.

In FIG. 3, there is a set of stations STN11 to STN1n connected to the network N1, of which a single station STN11 is depicted for simplified description. Likewise, there is a set of stations STN21 to STN2n connected to the network N2, of which a single station STN21 is depicted, there being a set of stations STN31 to STN3n connected to the network N3, of which a single station STN31 is depicted.

As illustrated in FIG. 3, there is a combination of n stations STN11 to STN1n, data transfer system DT1, n stations STN21 to STN2n, data transfer system DT2, and n stations STN31 to STN3n each respectively including a memory or memories (2, 12, 14, 3, 15, 17, 4) shared to be common. Each shared memory is divided into, to set up, a global shared memory area (2a, 12a, 14a, 3a, 15a, 17a, or 4a) sharable to be common among the networks N1, N2, and N3, and a local shared memory area (2b, 12b, 14b, 3b, 15b, 17b, or 4b) effective simply within a corresponding one of the networks.

There comes transfer of shared data to stations STN11 to STN1n with a transfer period referred herein to as a first transfer period, there coming transfer of shared data to stations STN21 to STN2n with a transfer period referred herein to as a second transfer period, and transfer of shared data to stations STN31 to STN3n with a transfer period referred herein to as a third transfer period.

And, the data transfer system DT1 is adapted to work in accordance with the first transfer period, to detect a first transfer timing as a time point of transfer of shared data from stations STN21 to STN2n to the data transfer system DT1, and a second transfer timing as a time point of transfer of shared data from the data transfer system DT1 to stations STN11 to STN1n.

The data transfer system DT1 is adapted to work in accordance with the second transfer period, to detect a third transfer timing as a time point of transfer of shared data from stations STN11 to STN1n to the data transfer system DT1, and a fourth transfer timing as a time point of transfer of shared data from the data transfer system DT1 to stations STN21 to STN2n.

The data transfer system DT2 is adapted to work in accordance with the third transfer period, to detect a fifth transfer timing as a time point of transfer of shared data from stations STN21 to STN2n to the data transfer system D12, and a sixth transfer timing as a time point of transfer of shared data from the data transfer system DT2 to stations STN31 to STN3n.

The data transfer system DT2 is adapted to work in accordance with the second transfer period, to detect a seventh transfer timing as a time point of transfer of shared data from stations STN31 to STN3n to the data transfer system DT2, and an eighth transfer timing as a time point of transfer of shared data from the data transfer system DT2 to stations STN21 to STN2n.

Description is now first made of actions of the network control system 1 along with operation of a control device PCS11 connected with a station STN11 in the network N1 to update a piece of shared data stored in global shared memory areas 2a.

As shown in FIG. 3, in the network N1, the station STN11 has a shared data "STN11Data" written at an address 5 in a shared memory area (as a global shared memory area 2a) thereof by a control device PCS11 connected with the station STN11, whereby the station STN11 works to transfer the written shared data "STN11Data" to a whole of stations STN12 to STN1n in the network N1 with the data transfer system DT1 inclusive.

And, the data transfer system DT1 detects a third transfer timing, whereby it works to receive the transferred shared data "STN11Data", and store the received shared data "STN11Data" at an address 5 in a shared memory area (as a global shared memory area 12a) thereof.

Next, the data transfer system DT1 works to have the shared data "STN11Data", as it is stored at the address 5 in the shared memory area (as the global shared memory area 12a), stored at an address 5 in a shared memory area (as a global shared memory area 14a) thereof.

The data transfer system DT1 detects a fourth transfer timing, whereby it works to transfer the shared data "STN11Data" as stored at the address 5 in the shared memory area (as the global shared memory area 14a) to whole stations STN21 to STN2n (FIG. 3 simply depicts the station STN21) connected to the network N2. And, the stations STN21 to STN2n each respectively have the transferred shared data "STN11Data" stored at an address 5 in a shared memory area (as a global shared memory area 3a) thereof.

Next, the station STN21 transfers the stored data "STN11Data" to a whole of stations STN22 to STN2n in the network N2 with the data transfer system DT2 inclusive.

And, the data transfer system DT2 detects a fifth transfer timing, whereby it works to receive the transferred shared data "STN11Data", and store the received shared data "STN11Data" at an address 5 in a shared memory area (as a global shared memory area 15a) thereof.

Next, the data transfer system DT2 works to have the shared data "STN11Data", as it is stored at the address 5 in the shared memory area (as the global shared memory area 15a), stored at an address 5 in a shared memory area (as a global shared memory area 17a) thereof.

The data transfer system DT2 detects a sixth transfer timing, whereby it works to transfer the shared data "STN11Data" as stored at the address 5 in the shared memory area (as the global shared memory area 17a) to whole stations STN31 to STN3n (FIG. 3 simply depicts the station STN31) connected to the network N3. And, the stations STN31 to STN3n each respectively have the transferred shared data "STN11Data" stored at an address 5 in a shared memory area (as a global shared memory area 4a) thereof.

It therefore is possible for a control device PCS31 to read the data "STN11Data" transferred to the station STN31 in the network N3.

Description is now made of actions of the network control system 1 along with operation of the control device PCS31 connected with the station STN31 in the network N3 to update a piece of shared data stored in global shared memory areas 4a.

As shown in FIG. 3, in the network N3, the control device PCS31 connected with the station STN31 writes a data "STN31Data" at an address 7 in the shared memory area (as the global shared memory area 4a) of the station STN31, whereby the station STN31 works to transfer the written data "STN31Data" to a whole of stations STN32 to STN3n in the network N3 with the data transfer system DT2 inclusive.

And, the data transfer system DT2 detects a seventh transfer timing, whereby it works to receive the transferred shared data "STN31Data", and store the received shared data "STN31Data" at an address 7 in the shared memory area (as the global shared memory area 17a).

Next, the data transfer system DT2 works to have the shared data "STN31Data", as it is stored at the address 7 in the shared memory area (as the global shared memory area 17a), stored at an address 7 in the shared memory area (as the global shared memory area 15a).

The data transfer system DT2 detects an eighth transfer timing, whereby it works to transfer the shared data "STN31Data" as stored at the address 7 in the shared memory area (as the global shared memory area 15a) to whole stations STN21 to STN2n connected to the network N2. And, the stations STN21 to STN2n each respectively have the transferred shared data "STN31Data" stored at an address 7 in a shared memory area (as a global shared memory area 3a) thereof.

Next, the station STN21 transfers the stored data "STN31Data" to a whole of stations STN22 to STN2n in the network N2 with the data transfer system DT2 inclusive.

And, the data transfer system DT1 detects a first transfer timing, whereby it works to receive the transferred shared data "STN31Data", and store the received shared data "STN31Data" at an address 5 in the shared memory area (as the global shared memory area 14a).

Next, the data transfer system DT1 works to have the shared data "STN31Data", as it is stored at the address 7 in the shared memory area (as the global shared memory area 14a), stored at an address 7 in the shared memory area (as the global shared memory area 12a).

The data transfer system DT1 detects a second transfer timing, whereby it works to transfer the shared data "STN31Data" as stored at the address 7 in the shared memory area (as the global shared memory area 12a) to whole stations STN11 to STN1n connected to the network N1. And, the stations STN11 to STN1n each respectively have the transferred shared data "STN31Data" stored at an address 7 in the shared memory area (as the global shared memory area 2a).

It therefore is possible for the control device PCS11 to read the data "STN31Data" transferred to the station STN11 in the network N1.

It is noted that in the example illustrated in FIG. 3 the data transfer system DT1 as well as DT2 has a combination of stations directly connected thereto as a first station and a second station. That is, to the data transfer system DT1, connected is a combination of station STN11 as a first station, and station STN21 as a second station. Also for the data transfer system DT2, connected thereto is a combination of station STN21 as a first station, and station STN31 as a second station For the data transfer system DT1, letting the station STN11 be a first station connected thereto, and the station STN21 be a second station, the station STN11 has a shared memory area (as a global shared memory area 2a) corresponding to a first memory element, the station STN21 having a shared memory area (as a global shared memory area 3a) corresponding to a second memory element, the data transfer system DT1 having a shared memory area (as a global shared memory area 12a) corresponding to a third memory element, the data transfer system DT1 having a shared memory area (as a global shared memory area 14a) corresponding to a fourth memory element.

Figure 4:
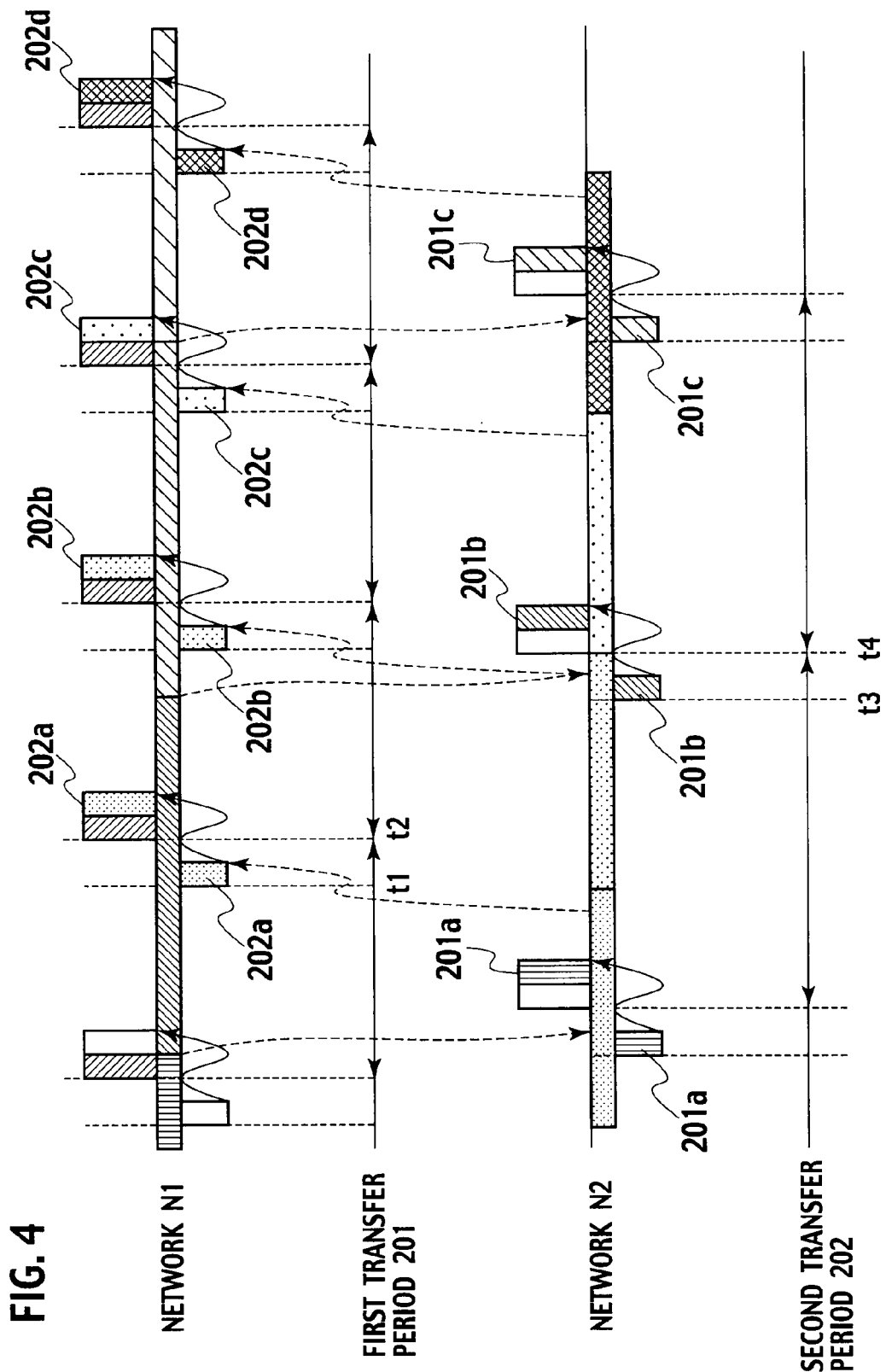
FIG. 4 is a time chart showing data transfer timings for transfer of data between a network N1 and a network N2.

FIG. 4 is a time chart of timings for data transfer in transfer of data between the network N1 and the network N2.

As illustrated in FIG. 4, there is a first transfer period 201 as a period of transfer in the network N1, that is, a transfer period in transfer of shared data from the data transfer system DT1 to stations STN11 to STN1n. Also, there is a second transfer period 202 as a period of transfer in the network N2, that is, a transfer period in transfer of shared data from the data transfer system DT1 to stations STN21 to STN2n.

First, at a time point t1, the data transfer system DT1 detects a first transfer timing, when it works to receive a shared data 202a transferred from any of stations STN21 to STN2n.

Then, at a time point t2, the data transfer system DT1 detects a second transfer timing, when it works to transfer the shared data 202a to stations STN11 to STN1n.

Also afterward, the data transfer system DT1 likewise works at each of first timing and second timing, to receive or transfer shared data.

Further, at a time point t3, the data transfer system DT1 detects a third transfer timing, when it works to receive a shared data 201b transferred from any of stations STN11 to STN1n.

Then, at a time point t4, the data transfer system DT1 detects a fourth transfer timing, when it works to transfer the shared data 201b to stations STN21 to STN2n.

Also afterward, the data transfer system DT1 likewise works at each of third timing and fourth timing, to receive or transfer shared data.

Such being the case, the data transfer system DT1 is adapted to work for data transfer in accordance with a transfer period of a network at a destination of transfer, affording to eliminate repetition of transfer of a shared data, thus always allowing for transfer of fresh shared data.

As is apparent from the foregoing, in the network control system 1 according to the first embodiment of the present invention, respective networks N1, N2, and N3 have their shared memory spaces divided into global shared memory areas shared to be common among the networks, and local shared memory areas independently set up for each of the networks N1, N2, and N3, thus eliminating the need of a superordinate network 110 in the past. There is no costing hardware for superordinate network 110, nor costing setup engineering for architecture of shared memory, thus affording to reduce an entire cost of network control system for plant control.

Further, there is a whole set of data stored in global shared memory areas 11 as data to be transferred between networks, permitting high rate transfer of data among whole networks N1, N2, and N3, without provision of superordinate network 110.

Further, there is transfer of data performed in accordance with a transfer period of a network at a destination end, allowing for an optimal transfer of shared data.

Further, at each of the networks N1, N2, and N3, there is a set of data stored in local shared memory areas independently set for the network, simply permitting an intra-network transfer at the network N1, N2, or N3, allowing for an enhanced efficiency in communication of entire network.

Further, there is a set of data stored in global shared memory areas shared to be common among the networks N1, N2, and N3, with common addresses among the networks, allowing for a facilitated engineering and trouble-shooting by user.

<Second Embodiment>

Figure 5:
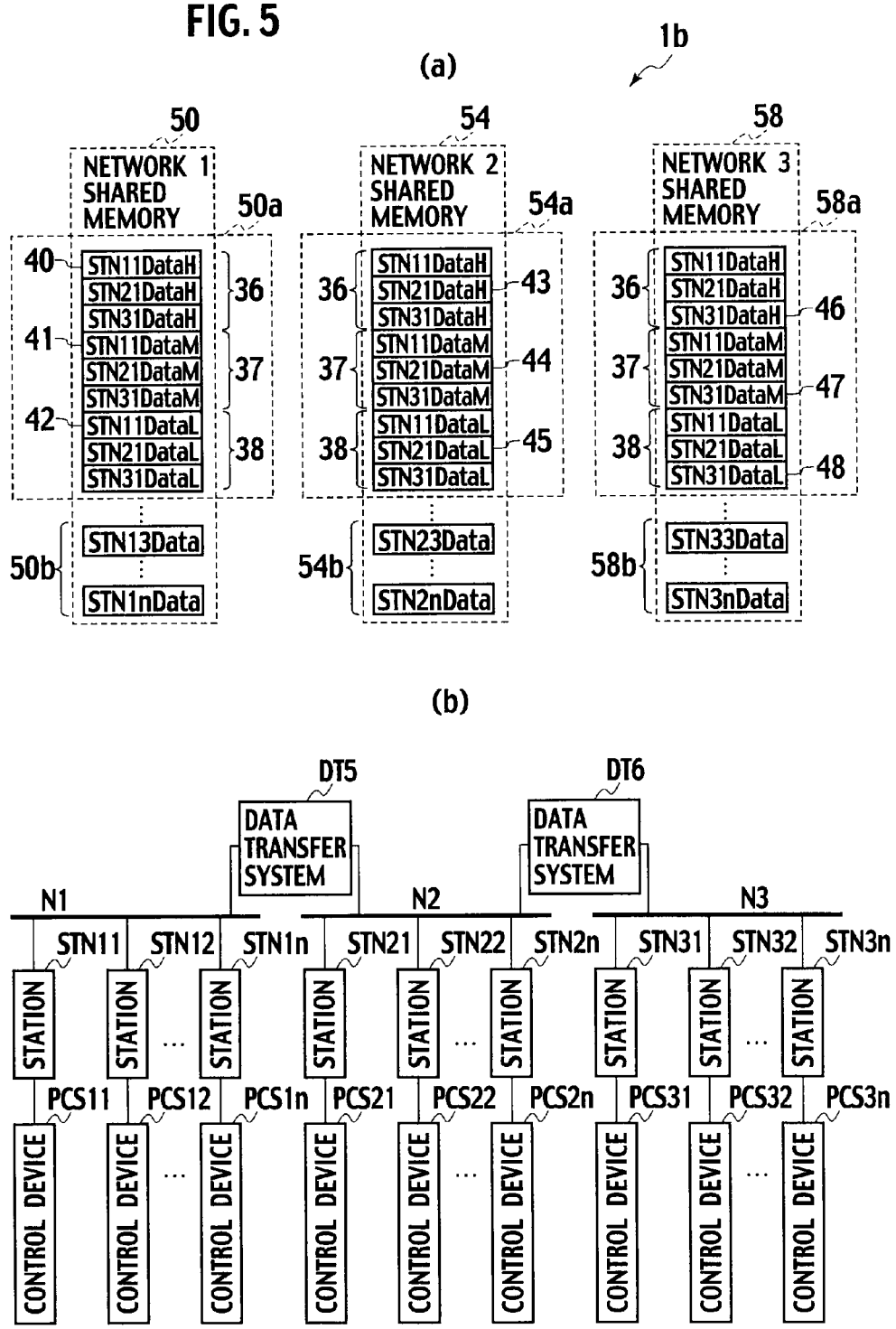
FIG. 5(a) is an explanatory diagram showing internal configurations of shared memories in a network control system according to a second embodiment of the present invention.
FIG. 5(b) is a configuration diagram showing a system configuration of the network control system according to the second embodiment of the present invention.

FIG. 5(a) is an explanatory diagram showing internal configurations of shared memories in a network control system according to a second embodiment of the present invention, and FIG. 5(b) is a configuration diagram showing a system configuration of the network control system according to the first embodiment of the present invention.

As shown in FIG. 5(b), the network control system 1b according to the second embodiment includes a data transfer system DT5 and a data transfer system DT6, substituting for the data transfer systems DT1 and DT2 as constituent parts of the network control system 1 according to the first embodiment, respectively.

Further, there are networks N1 to N3 including stations having their shared memories each divided into sub-areas, by orders of priority of shared data, as illustrated in FIG. 5(a). More specifically, in the network N1, each shared memory 50a is divided into classes of transfer rate as set up in three ranks being a high transfer rate block 36, a medium transfer rate block 37, and a low transfer rate block 38. Also in the network N2, each shared memory 54a is divided into prioritized classes likewise set up in three ranks, as well as each shared memory 58a in the network N3.

Figure 6:
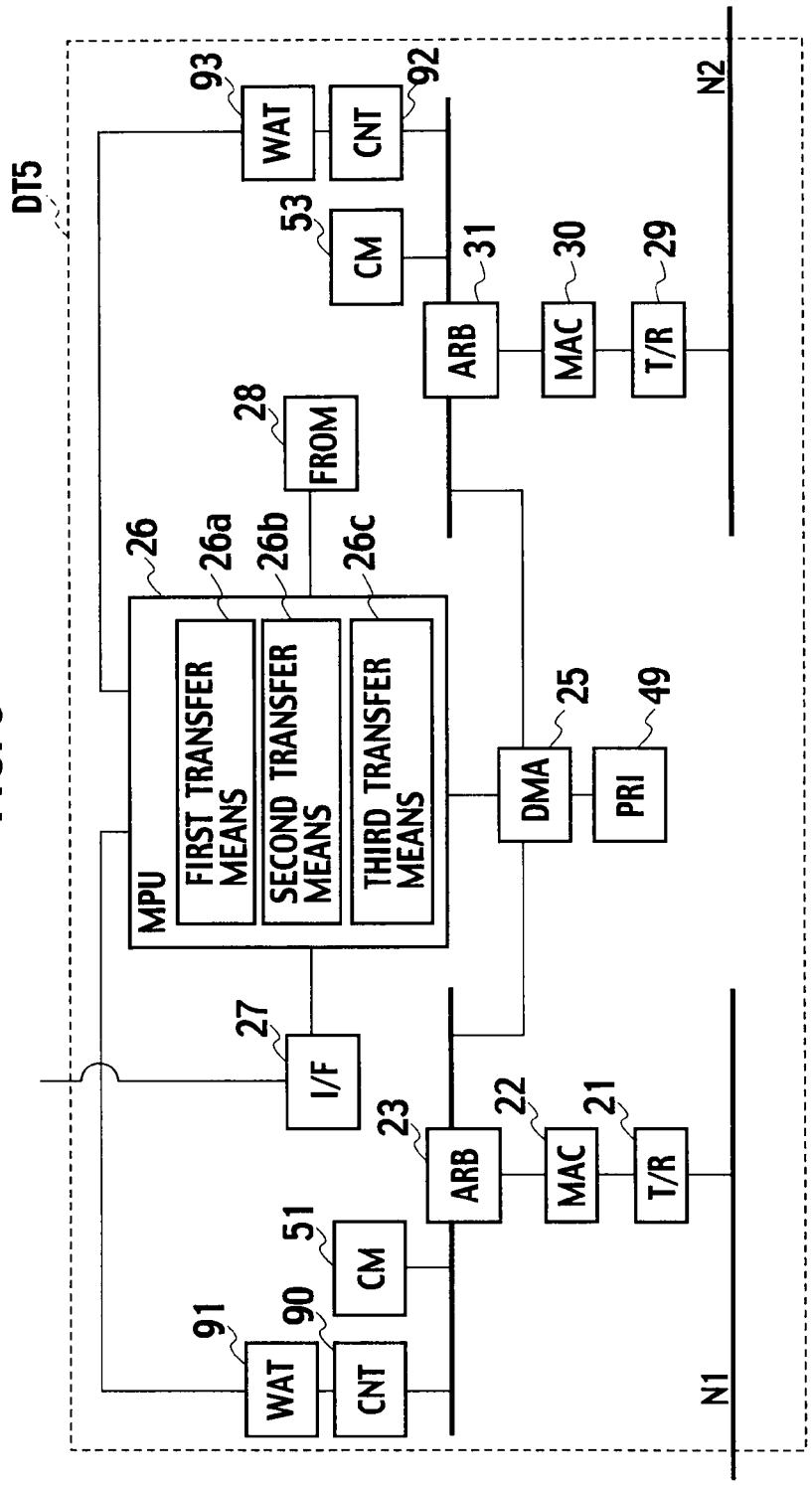
FIG. 6 is a configuration diagram showing a hardware configuration of a data transfer system DT5 in the network control system 1b according to the second embodiment.

FIG. 6 is a configuration diagram showing a hardware configuration of the data transfer system DT5 in the network control system 1b according to the second embodiment. It is noted that the data transfer system DT6 is similar in configuration to the data transfer system DT5, and description thereof is omitted.

As shown in FIG. 6, in the network control system 1b according to the second embodiment, the data transfer system DT5 includes a combination of T/R's 21 and 29 configured as transmitter receiver sets, a combination of MAC's 22 and 30 configured as medium access controllers, a combination of ARB's 23 and 31 configured as bus traffic arbitrators, a CM 51 configured as a common memory shared in the network N1, a CM 53 configured as a common memory shared in the network N2, a DMA 25, an MPU 26 configured for central control, an I/F 27 configured as a transfer parameter in-taking interface, an FROM 28 configured as a transfer parameter memory, a PRI 49 configured as a transfer priority degree manager, a combination of CNT's 90 and 92 configured as transfer controllers, and a combination of WAT's 91 and 93 configured as transfer period monitors.

The CM 51 is divided, like a shared memory 50 illustrated in FIG. 5(a), into an area set up as (a global shared memory area 51a) being sharable to be common among the networks N1 to N3, and an area set up as (a local shared memory area 51b) being effective simply within the network N1. Further, the global shared memory area 51a is divided into sub-areas, by orders of priority of shared data, like the shared memory 50 illustrated in FIG. 5(a). More specifically, the global shared memory area 51a is divided into classes of transfer rate as set up in three ranks being a high transfer rate block 36, a medium transfer rate block 37, and a low transfer rate block 38.

The CM 53 is divided, like a shared memory 54 illustrated in FIG. 5(a), into an area set up as (a global shared memory area 53a) being sharable to be common among the networks N1 to N3, and an area set up as (a local shared memory area 53b) being effective simply within the network N2. Further, the global shared memory area 53a is divided into sub-areas, by orders of priority of shared data, like the shared memory 54 illustrated in FIG. 5(a). More specifically, the global shared memory area 53a is divided into classes of transfer rate as set up in three ranks being a high transfer rate block 36, a medium transfer rate block 37, and a low transfer rate block 38.

The PRI 49 is configured to store therein, as pieces of information on order of priority, respective orders of priorities in transfer of shared data between the data transfer system DT5 and a set of stations STN11 to STN1n, as well as between the data transfer system DT5 and a set of stations STN21 to STN2n. The priority order information stored includes sets of addresses of global shared memory areas and associated orders of priorities each representing a high rate, a medium rate, or a low rate.

The CNT 90 is configured to read a piece of information on order of priority from the PRI 149, and work on the basis of information on priority order, to determine a first transfer period as a transfer period in transfer of shared data from the data transfer system DT5 to stations STN11 to STN1*n*. More specifically, the CNT 90 selects a transfer period according to the priority order information representing a high rate, a medium rate, or a low rate, to provide the selected transfer period as a first transfer period. For instance, for a piece of priority order information representing a high rate, the CNT 90 selects a high-rate transfer period, to provide as a first transfer period. The MPU 26 is thereby adapted for transfer of a shared data in accordance with the high-rate transfer period selected as a first transfer period. Making a transfer of shared data in accordance with a high-rate transfer period selected as a transfer period will be referred herein to as a high rate transfer. Likewise, making a transfer of shared data in accordance with a low-rate transfer period selected as a transfer period will be referred herein to as a low rate transfer.

The WAT 91 is configured to work in accordance with the first transfer period determined by the CNT 90, to detect a time point of transfer of shared data from the data transfer system DT5 to stations STN11 to STN1*n*, as a second transfer timing. Further, the WAT 91 is configured to detect a time point of reception of shared data from any of stations STN21 to STN2*n* to the data transfer system DT5, as a first transfer timing to be a time point earlier than the second transfer timing by a prescribed time interval. And, the WAT 91 is adapted to work upon detection of the first transfer timing or the second transfer timing, to supply the MPU 26 with a signal representing the detection.

The CNT 92 is configured to read a piece of information on order of priority from the PRI 149, and work on the basis of information on priority order, to determine a second transfer period as a transfer period in transfer of shared data from the data transfer system DT5 to stations STN21 to STN2*n*. More specifically, the CNT 92 selects a transfer period according to the priority order information representing a high rate, a medium rate, or a low rate, to provide the selected transfer period as a second transfer period.

The WAT 93 is configured to work in accordance with the second transfer period determined by the CNT 92, to detect a time point of transfer of shared data from the data transfer system DT5 to stations STN21 to STN2*n*, as a fourth transfer timing. Further, the WAT 93 is configured to detect a time point of reception of shared data from any of stations STN11 to STN1*n* to the data transfer system DT5, as a third transfer timing to be a time point earlier than the fourth transfer timing by a prescribed time interval. And, the WAT 93 is adapted to work upon detection of the third transfer timing or the fourth transfer timing, to supply the MPU 26 with a signal representing the detection.

Functionally, the MPU 26 is configured with a first transfer means 26*a*, a second transfer means 26*b*, and a third transfer means 26*c*. And, the first transfer means 26*a*, the second transfer means 26*b*, and the third transfer means 26*c* are each adapted to read pieces of information on global shared memories in the FROM 28, to make the following control actions in accordance with read information on setting.

At the MPU 26, the first transfer means 26*a* is adapted to operate in accordance with a first transfer period determined by the CNT 90, to have pieces of shared data as stored in global shared memory areas of stations STN21 to STN2*n*, stored in a global shared memory area of the CM 53, with addresses identical to their addresses in those global shared memory areas.

More specifically, the first transfer means 26*a* operates, at a first transfer timing, to store in the CM 53 those pieces of shared data received from the network N2, by employing the T/R 29, the MAC 30, and the ARB 31.

Further, at the MPU 26, the first transfer means 26*a* is adapted to operate in accordance with a second transfer period determined by the CNT 92, to have pieces of shared data as stored in global shared memory areas of stations STN11 to STN1*n*, stored in a global shared memory area of the CM 51, with addresses identical to their addresses in those global shared memory areas.

More specifically, the first transfer means 26*a* operates, at a third transfer timing, to store in the CM 12 those pieces of shared data received from the network N1, by employing the T/R 21, the MAC 22, and the ARB 23.

At the MPU 26, the second transfer means 26*b* is adapted to operate, as the CM 51 has pieces of shared data stored in the global shared memory area by the first transfer means 26*a*, to store the pieces of shared data in the global shared memory area of the CM 53, with addresses identical to their addresses in the global shared memory area of the CM 51.

More specifically, the second transfer means 26*b* operates to have pieces of shared data as stored in the global shared memory area of the CM 51, stored in the global shared memory area of the CM 53, by employing the ARB 23, the DMA 25, and the ARB 31.

Further, at the MPU 26, the second transfer means 26*b* is adapted to operate, as the CM 14 has pieces of shared data stored in the global shared memory area by the first transfer means 26*a*, to store the pieces of shared data in the global shared memory area of the CM 12, with addresses identical to their addresses in the global shared memory area of the CM 14.

More specifically, the second transfer means 26*b* operates to have pieces of shared data as stored in the global shared memory area of the CM 53, stored in the global shared memory area of the CM 51, by employing the ARB 31, the DMA 25, and the ARB 23.

At the MPU 26, the third transfer means 26*c* is adapted to operate in accordance with a second transfer period supplied from the WAT 93, to have pieces of shared data as stored in the global shared memory area of the CM 53, stored in global shared memory areas of stations STN21 to STN2*n*, with addresses identical to their addresses in the global shared memory area of the CM 13.

More specifically, the third transfer means 26*c* operates, at a fourth transfer timing, to have pieces of shared data as stored in the global shared memory area of the CM 53, stored in the global shared memory areas of stations STN21 to STN2*n*, by employing the ARB 31, the MAC 30, and the T/R 29.

Further, at the MPU 26, the third transfer means 26*c* is adapted to operate in accordance with a first transfer period supplied from the WAT 91, to have pieces of shared data as stored in the global shared memory area of the CM 51, stored in global shared memory areas of stations STN11 to STN1*n*, with addresses identical to their addresses in the global shared memory area of the CM 51.

More specifically, the third transfer means 26*c* operates, at a second transfer timing, to have pieces of shared data as stored in the global shared memory area of the CM 51, stored in the global shared memory areas of stations STN11 to STN1*n*, by employing the ARB 23, the MAC 22, and the T/R 21.

Figure 7:
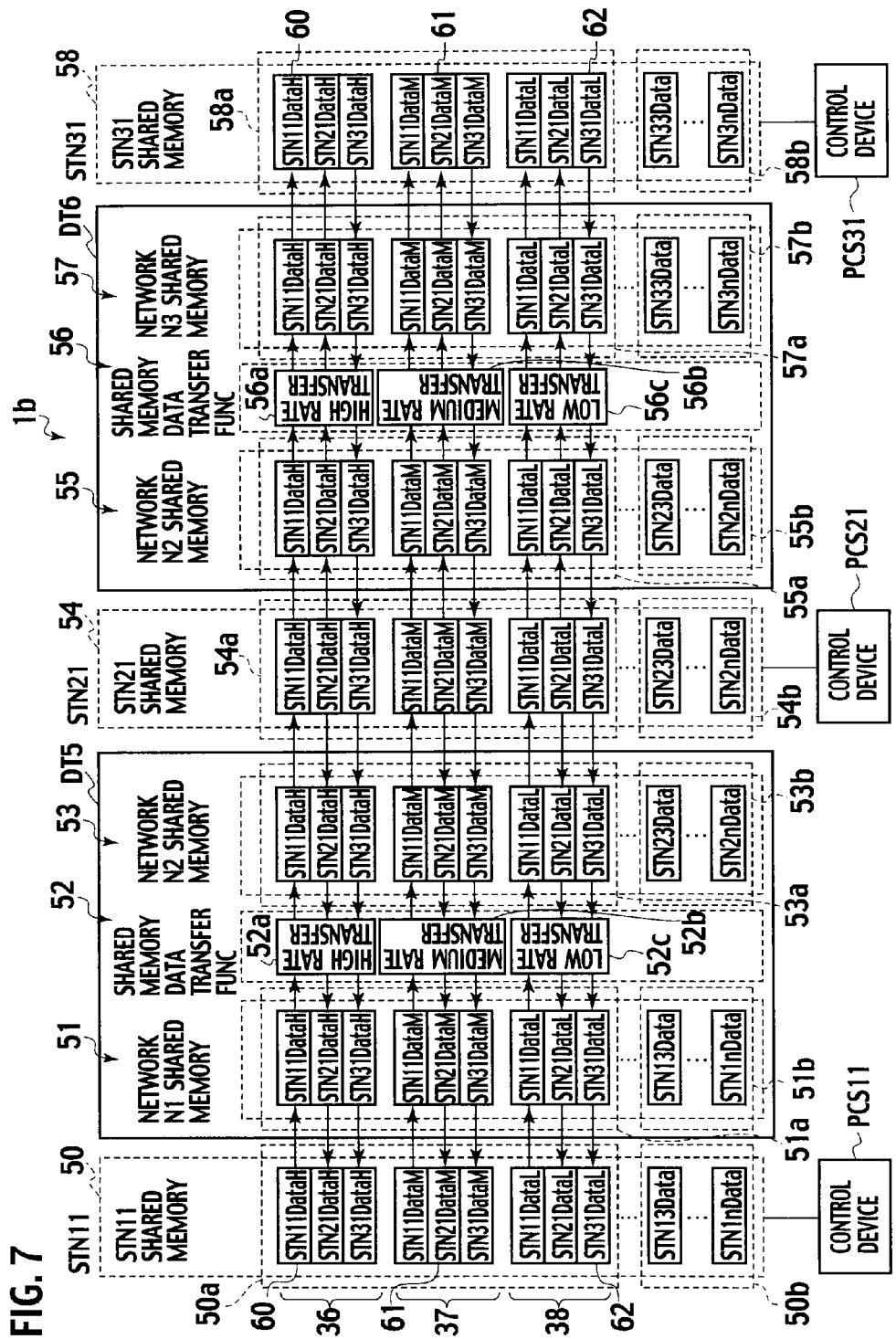
FIG. 7 is a diagram describing data transfer of shared data among networks N1, N2, and N3.

Description is now made of actions of the network control system 1*b* according to the second embodiment of the present invention, with reference to FIG. 7.

FIG. 7 is a diagram describing data transfer of shared data among networks N1, N2, and N3 in the network control system 1b according to the second embodiment of the present invention.

In FIG. 7, there is a set of stations STN11 to STN1n connected to the network N1, of which a single station STN11 is depicted for simplified description. Likewise, there is a set of stations STN21 to STN2n connected to the network N2, of which a single station STN21 is depicted, there being a set of stations STN31 to STN3n connected to the network N3, of which a single station STN31 is depicted.

As illustrated in FIG. 7, there is a combination of n stations STN11 to STN1n, data transfer system DT5, n stations STN21 to STN2n, data transfer system DT6, and n stations STN31 to STN3n each respectively including a memory or memories (50, 51, 53, 54, 55, 57, 58) shared to be common. Each shared memory is divided into, to set up, a global shared memory area (50a, 51a, 53a, 54a, 55a, 57a, or 58a) sharable to be common among the networks N1, N2, and N3, and a local shared memory area (50b, 51b, 53b, 54b, 55b, 57b, or 58b) effective simply within a corresponding one of the networks.

Further, the global shared memory area (50a, 51a, 53a, 54a, 55a, 57a, or 58a) is divided into classes of transfer rate as set up in ranks to be a high transfer rate block 36, a medium transfer rate block 37, and a low transfer rate block of 38.

There comes transfer of shared data to stations STN11 to STN1n with a transfer period referred herein to as a first transfer period, there coming transfer of shared data to stations STN21 to STN2n with a transfer period referred herein to as a second transfer period, and transfer of shared data to stations STN31 to STN3n with a transfer period referred herein to as a third transfer period. The first transfer period is determined in correspondence to a piece of information on priority order representing a high rate, a medium rate, or a low rate. Likewise, the second transfer period and the third transfer period also are each determined in correspondence to a piece of information on priority order representing a high rate, a medium rate, or a low rate.

And, the data transfer system DT5 is adapted to work in accordance with the first transfer period, to detect a first transfer timing as a time point of transfer of shared data from stations STN21 to STN2n to the data transfer system DT5, and a second transfer timing as a time point of transfer of shared data from the data transfer system DT5 to stations STN11 to STN1n.

The data transfer system DT5 is adapted to work in accordance with the second transfer period, to detect a third transfer timing as a time point of transfer of shared data from stations STN11 to STN1n to the data transfer system DT5, and a fourth transfer timing as a time point of transfer of shared data from the data transfer system DT5 to stations STN21 to STN2n.

The data transfer system DT6 is adapted to work in accordance with the third transfer period, to detect a fifth transfer timing as a time point of transfer of shared data from stations STN21 to STN2n to the data transfer system DT6, and a sixth transfer timing as a time point of transfer of shared data from the data transfer system DT6 to stations STN31 to STN3n.

The data transfer system DT6 is adapted to work in accordance with the second transfer period, to detect a seventh transfer timing as a time point of transfer of shared data from stations STN31 to STN3n to the data transfer system DT6, and an eighth transfer timing as a time point of transfer of shared data from the data transfer system DT6 to stations STN21 to STN2n.

Description is now first made of actions along with operation for a control device PCS11 connected with a station STN11 in the network N1 to update a piece of shared data stored in a high transfer rate block of a global shared memory areas 50a.

As shown in FIG. 7, in the network N1, the control device PCS11 connected with the station STN11 writes a data "STN11DataH" at an address 60 set in a high transfer rate block 36 of a shared memory area (as a global shared memory area 50a) of the station STN11, whereby the station STN11 works to high-rate transfer the written data "STN11DataH" to a whole of stations STN12 to STN1n in the network N1 with the data transfer system DT5 inclusive.

And, the data transfer system DT5 detects a third transfer timing, whereby it works to receive the transferred shared data "STN11DataH", and store the received shared data "STN11DataH" at an address 60 set in a high transfer rate block 36 of a shared memory area (as a global shared memory area 51a) thereof.

Next, the data transfer system DT5 works to have the shared data "STN11DataH", as it is stored at the address 60 in the shared memory area (as the global shared memory area 51a), stored at an address 60 set in a high transfer rate block 36 of a shared memory area (as a global shared memory area 53a) thereof.

The data transfer system DT5 detects a fourth transfer timing, whereby it works to high-rate transfer the shared data "STN11DataH" as stored at the address 60 in the shared memory area (as the global shared memory area 53a) to whole stations STN21 to STN2n (FIG. 7 simply depicts the station STN21) connected to the network N2. And, the stations STN21 to STN2n each respectively have the high-rate transferred shared data "STN11DataH" stored at an address 60 set in a high transfer rate block 36 of a shared memory area (as a global shared memory area 54a) thereof.

Next, the station STN21 high-rate transfers the stored data "STN11DataH" to a whole of stations STN22 to STN2n in the network N2 with the data transfer system DT6 inclusive.

And, the data transfer system DT6 detects a fifth transfer timing, whereby it works to receive the high-rate transferred shared data "STN11DataH", and store the received shared data "STN11DataH" at an address 60 set in a high transfer rate block 36 of a shared memory area (as a global shared memory area 55a) thereof.

Next, the data transfer system DT6 works to have the shared data "STN11DataH", as it is stored at the address 60 in the shared memory area (as the global shared memory area 55a), stored at an address 60 set in a high transfer rate block 36 of a shared memory area (as a global shared memory area 57a) thereof.

The data transfer system DT6 detects a sixth transfer timing, whereby it works to high-rate transfer the shared data "STN11DataH" as stored at the address 60 in the shared memory area (as the global shared memory area 57a) to whole stations STN31 to STN3n (FIG. 7 simply depicts the station STN31) connected to the network N3. And, the stations STN31 to STN3n each respectively have the high-rate transferred shared data "STN11DataH" stored at an address 60 set in a high transfer rate block 36 of a shared memory area (as a global shared memory area 58a) thereof.

It therefore is possible for a control device PCS31 to read the data "STN11DataH" transferred to the station STN31 in the network N3.

Description is now made of actions along with operation for the control device PCS31 connected with the station STN31 in the network N3 to update a piece of shared data stored in a low transfer rate block of the global shared memory areas 58a.

As shown in FIG. 7, in the network N3, the control device PCS31 connected with the station STN31 writes a data "STN31DataL" at an address 62 set in a low transfer rate block 38 of the shared memory area (as the global shared memory area 58a) of the station STN31, whereby the station STN31 works to low-rate transfer the written data "STN31DataL" to a whole of stations STN32 to STN3n in the network N3 with the data transfer system DT6 inclusive.

And, the data transfer system DT6 detects a seventh transfer timing, whereby it works to receive the low-rate transferred shared data "STN31DataL", and store the received shared data "STN31DataL" at an address 62 set in a low transfer rate block 38 of the shared memory area (as the global shared memory area 57a).

Next, the data transfer system DT6 works to have the shared data "STN31DataL", as it is stored at the address 62 in the shared memory area (as the global shared memory area 57a), stored at an address 62 set in a low transfer rate block 38 of the shared memory area (as the global shared memory area 55a).

The data transfer system DT6 detects an eighth transfer timing, whereby it works to low-rate transfer the shared data "STN31DataL" as stored at the address 62 in the shared memory area (as the global shared memory area 55a) to whole stations STN21 to STN2n connected to the network N2. And, the stations STN21 to STN2n each respectively have the transferred shared data "STN31DataL" stored at an address 62 set in a low transfer rate block 38 of the shared memory area (as the global shared memory area 54a).

Next, the station STN21 low-rate transfers the stored data "STN31DataL" to a whole of stations STN22 to STN2n in the network N2 with the data transfer system DT5 inclusive.

And, the data transfer system DT5 detects a first transfer timing, whereby it works to receive the transferred shared data "STN31DataL", and store the received shared data "STN31DataL" at an address 62 set in a low transfer rate block 38 of the shared memory area (as the global shared memory area 53a).

Next, the data transfer system DT5 works to have the shared data "STN31DataL", as it is stored at the address 62 in the shared memory area (as the global shared memory area 53a), stored at an address 62 set in a low transfer rate block 38 of the shared memory area (as the global shared memory area 51a).

The data transfer system DT5 detects a second transfer timing, whereby it works to low-rate transfer the shared data "STN31DataL" as stored at the address 62 in the shared memory area (as the global shared memory area 51a) to whole stations STN11 to STN1n connected to the network N1. And, the stations STN11 to STN1n each respectively have the transferred shared data "STN31DataL" stored at an address 62 set in a low transfer rate block 38 of the shared memory area (as the global shared memory area 50a).

It therefore is possible for the control device PCS11 to read the data "STN31DataL" transferred to the station STN11 in the network N1.

It is noted that in the example illustrated in FIG. 7 the data transfer system DT5 as well as DT6 has a combination of stations directly connected thereto as a first station and a second station. That is, to the data transfer system DT5, connected is a combination of station STN11 as a first station, and station STN21 as a second station. Also for the data transfer system DT6, connected thereto is a combination of station STN21 as a first station, and station STN31 as a second station For the data transfer system DT5, letting the station STN11 be a first station connected thereto, and the station STN21 be a second station, the station STN11 has a shared memory area (as a global shared memory area 50a) corresponding to a first memory element, the station STN21 having a shared memory area (as a global shared memory area 54a) corresponding to a second memory element, the data transfer system DT5 having a shared memory area (as a global shared memory area 51a) corresponding to a third memory element, the data transfer system DT5 having a shared memory area (as a global shared memory area 53a) corresponding to a fourth memory element.

According to the second embodiment, the network control system 1b is adapted in addition to effects of the network control system 1 according to the first embodiment, to have a plurality of transfer rates set for transfer of shared data among networks, allowing for an enhanced efficiency in use of the networks.

<Third Embodiment>

Description is now made of a network control system 1c according to a third embodiment.

Figure 8:
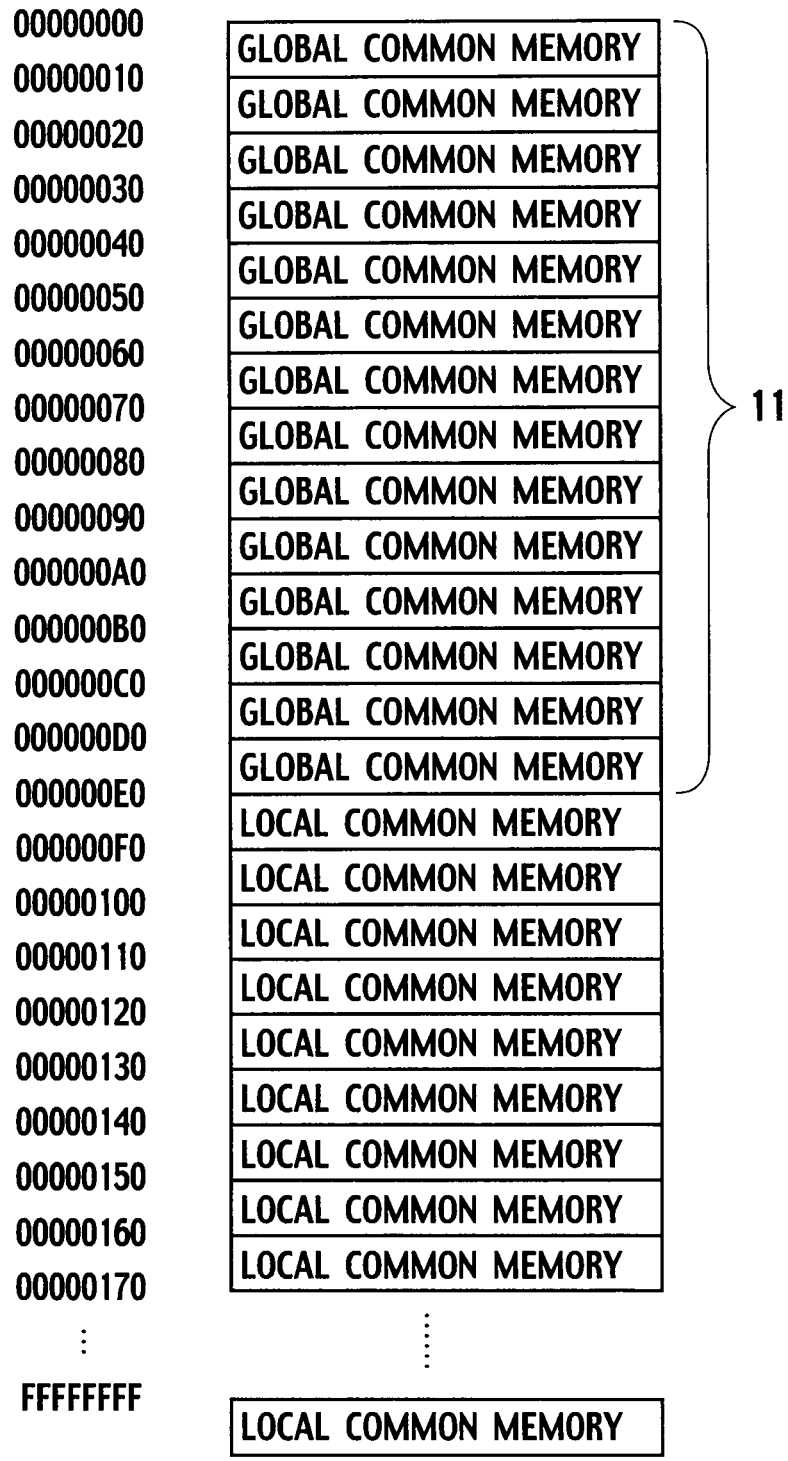
FIG. 8 is an explanatory diagram showing an example of global shared memory area 11 set up as an army of consecutive areas from a beginning address.

FIG. 8 is an explanatory diagram showing an example of global shared memory area 11 set up as an array of consecutive areas from a beginning address.

As illustrated in FIG. 8, there is an array of consecutive areas set as a global shared memory area 11, to thereby implement a data transfer system between networks with an increased data transfer rate. In this respect, simply with an enabled setup of an array of consecutive areas, there might appear inconveniences in extension or modification of global shared memory area 11 by users.

To this point, according to the third embodiment, the network control system 1c is configured for adaptation to set up a global shared memory area 11 using an arbitrary subset of a set of areas in a network shared memory space, in a voluntary manner.

FIG. 9 is a configuration diagram showing a system configuration of the network control system 1c according to the third embodiment.

As illustrated in FIG. 9, the network control system 1c according to the third embodiment includes, besides a configuration of network control system 1 according to the first embodiment, an engineering system 63 configured with a memory area (as a global shared memory area 11) shared to be common among whole networks, to download settings thereof to respective stations STN and data transfer systems DT1 and DT2.

The engineering system 63 has the memory area (as the global shared memory area 11) set up to share among whole networks N1, N2, and N3. The engineering system 63 is connected to the network N1, and has its setting values downloaded to whole stations STN11 to STN1n in the network N1 and the data transfer system DT1. The data transfer system DT1 works to transfer the downloaded setting values to the network N2, whereby the setting values are downloaded to whole stations STN21 to STN2n in the network N2 and the data transfer system DT2.

The data transfer system DT2 works to transfer the downloaded setting values to the network N3, whereby the setting values are downloaded to whole stations STN31 to STN3n in the network N3.

And, the data transfer system DT1 has a global shared memory area 11 set up in an arbitrary subset of a set of areas in a network shared memory space thereof in accordance with shared setting information.

FIG. 10 is an explanatory diagram showing an example of global shared memory area set up with memory areas according to shared setting information.

As illustrated in FIG. 10, the network control system 1c according to the third embodiment is adapted to have a global shared memory area 11 set up in an arbitrary subset of a set of areas in a network shared memory space in a voluntary manner, allowing for efficient utilization of the global shared memory area 11 being shared among the whole networks.

The engineering system 63 is connected to the network N1 in a configuration shown by the configuration diagram in FIG. 9, while this configuration is not restrictive. For instance, there may be a configuration including an engineering system 63 individually connected to respective stations and data transfer systems each adapted to download setting values as setting information to be shared.

<Fourth Embodiment>

Figure 11:
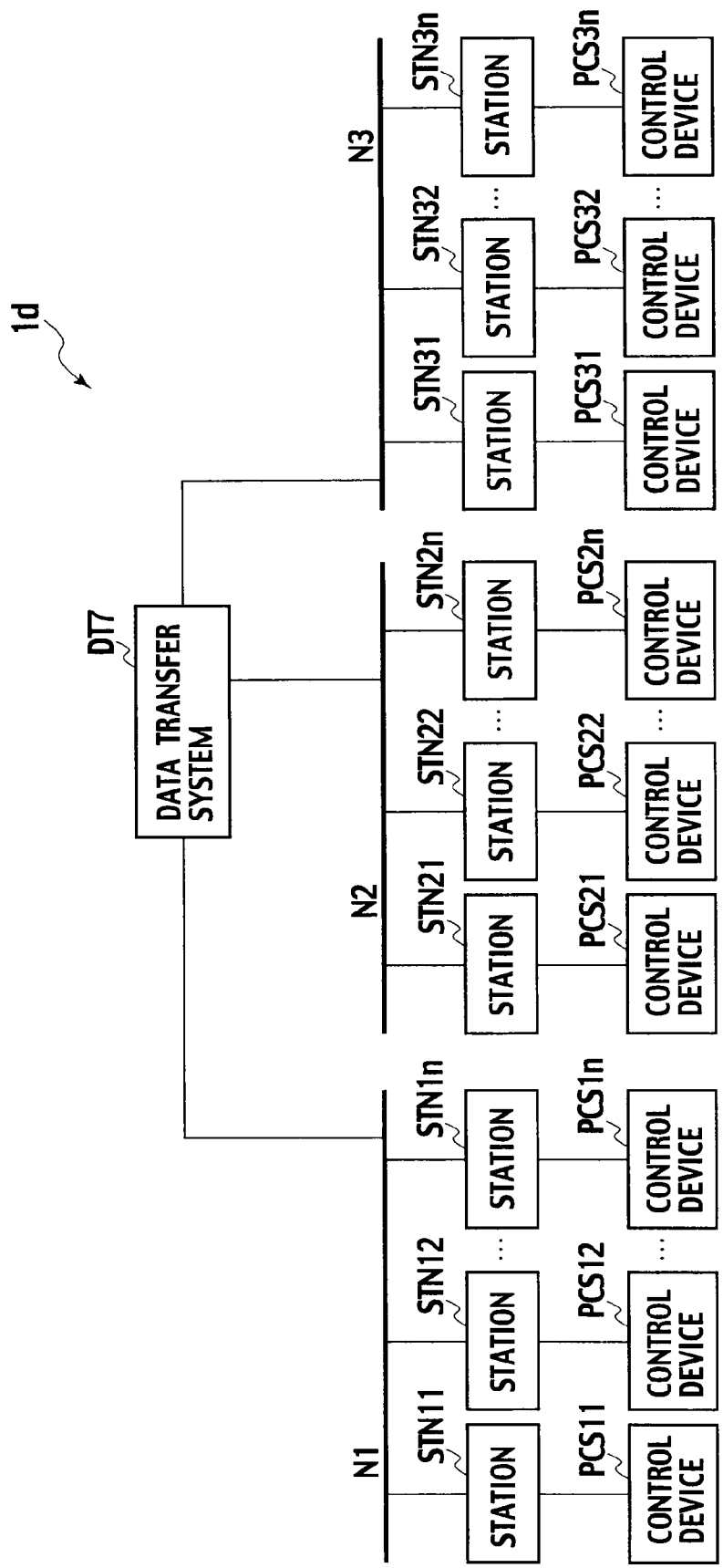
FIG. 11 is a configuration diagram showing a system configuration of a network control system 1d according to a fourth embodiment.

FIG. 11 is a configuration diagram showing a system configuration of a network control system 1d according to a fourth embodiment.

As shown in FIG. 11, the network control system 1d according to the fourth embodiment includes a data transfer system DT7 configured to implement transfer of data among whole networks, substituting for the combination of data transfer systems DT1 and DT2 in configuration of the network control system 1 according to the first embodiment.

Figure 12:
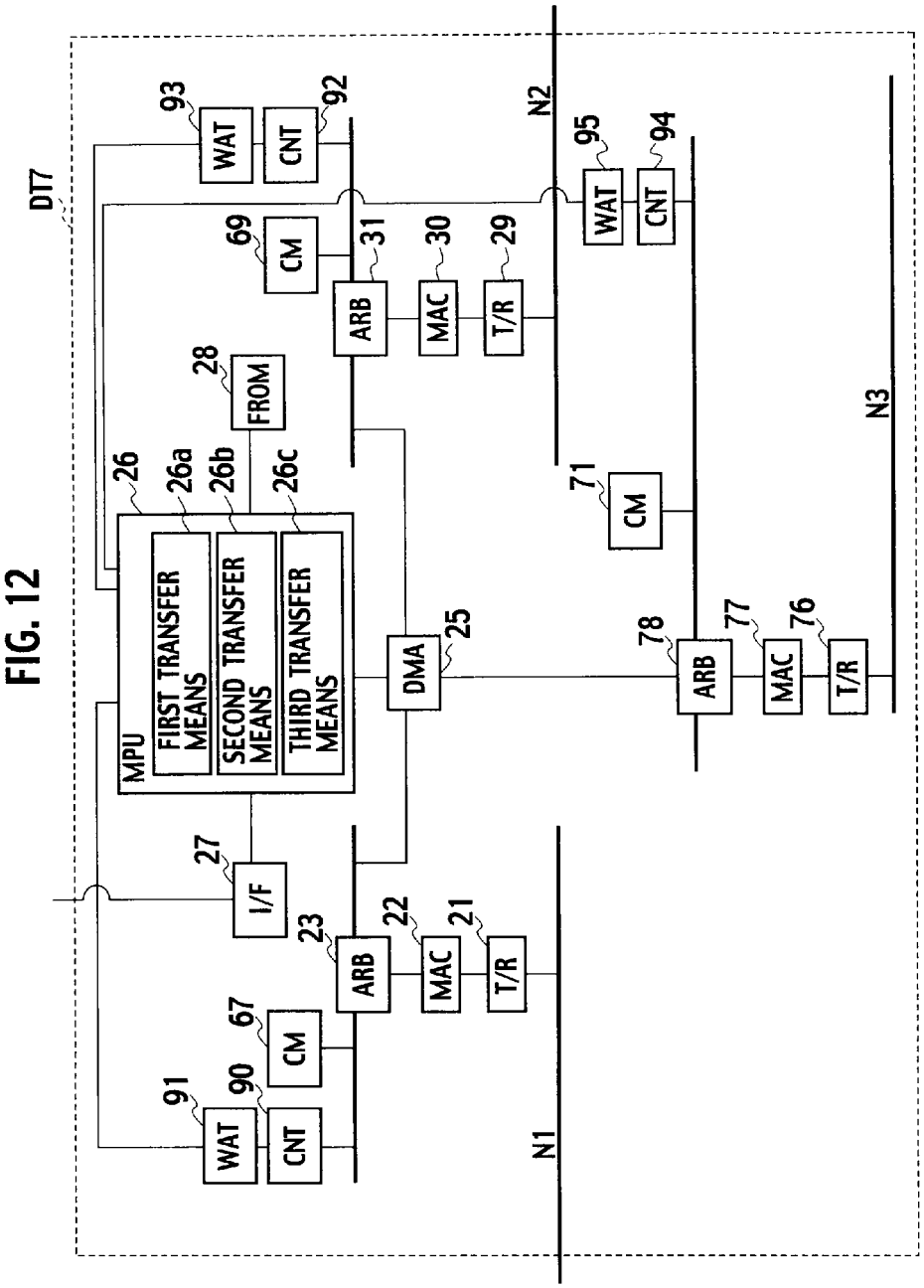
FIG. 12 is a configuration diagram showing a hardware configuration of a data transfer system DT7 in the network control system 1d according to the fourth embodiment.

FIG. 12 is a configuration diagram showing a hardware configuration of the data transfer system DT7 in the network control system 1d according to the fourth embodiment.

As shown in FIG. 12, in the network control system 1d according to the fourth embodiment, the data transfer system DT7 includes a combination of T/R's 21, 29, and 76 configured as transmitter receiver sets, a combination of MAC's 22, 30, and 77 configured as medium access controllers, a combination of ARB's 23, 31, and 78 configured as bus traffic arbitrators, a CM 67 configured as a common memory shared in a network N1, a CM 69 configured as a common memory shared in a network N2, a CM 71 configured as a common memory shared in a network N3, a DMA 25, an MPU 26 configured for central control, an I/F 27 configured as a transfer parameter in-taking interface, an FROM 28 configured as a transfer parameter memory, a combination of CNT's 90, 92, and 94 configured as transfer controllers, and a combination of WAT's 91, 93, and 95 configured as transfer period monitors.

The CM 67 is divided, like the shared memory 2 illustrated in FIG. 1(a), into an area set up as (a global shared memory area 67a) being sharable to be common among the networks N1 to N3, and an area set up as (a local shared memory area 67b) being effective simply within the network N1.

The CM 69 is divided, like the shared memory 3 illustrated in FIG. 1(a), into an area set up as (a global shared memory area 69a) being shamble to be common among the networks N1 to N3, and an area set up as (a local shared memory area 69b) being effective simply within the network N2.

The CM 71 is divided, like the shared memory 4 illustrated in FIG. 1(a), into an area set up as (a global shared memory area 71a) being sharable to be common among the networks N1 to N3, and an area set up as (a local shared memory area 71b) being effective simply within the network N3.

The CNT 90 is configured to determine a first transfer period as a transfer period in transfer of shared data from the data transfer system DT7 to stations STN11 to STN1n.

The WAT 91 is configured to work in accordance with the first transfer period determined by the CNT 90, to detect a time point of transfer of shared data from the data transfer system DT7 to stations STN11 to STN1n, as a second transfer timing. Further, the WAT 91 is configured to detect a time point of reception of shared data from any of stations STN21 to STN2n and stations STN31 to STN3n to the data transfer system DT7, as a first transfer timing to be a time point earlier than the second transfer timing by a prescribed time interval. And, the WAT 91 is adapted to work upon detection of the first transfer timing or the second transfer timing, to supply the MPU 26 with a signal representing the detection.

The CNT 92 is configured to determine a second transfer period as a transfer period in transfer of shared data from the data transfer system DT7 to stations STN21 to STN2n.

The WAT 93 is configured to work in accordance with the second transfer period determined by the CNT 92, to detect a time point of transfer of shared data from the data transfer system DT7 to stations STN21 to STN2n, as a fourth transfer timing. Further, the WAT 93 is configured to detect a time point of reception of shared data from any of stations STN11 to STN1n and stations STN31 to STN3n to the data transfer system DT7, as a third transfer timing to be a time point earlier than the fourth transfer timing by a prescribed time interval. And, the WAT 93 is adapted to work upon detection of the third transfer timing or the fourth transfer timing, to supply the MPU 26 with a signal representing the detection.

The CNT 94 is configured to determine a third transfer period as a transfer period in transfer of shared data from the data transfer system DT7 to stations STN31 to STN3n.

The WAT 95 is configured to work in accordance with the third transfer period determined by the CNT 94, to detect a time point of transfer of shared data from the data transfer system DT7 to stations STN31 to STN3n, as a sixth transfer timing. Further, the WAT 95 is configured to detect a time point of reception of shared data from any of stations STN11 to STN1n and stations STN21 to STN2n to the data transfer system DT7, as a fifth transfer timing to be a time point earlier than the sixth transfer timing by a prescribed time interval. And, the WAT 95 is adapted to work upon detection of the fifth transfer timing or the sixth transfer timing, to supply the MPU 26 with a signal representing the detection.

Further, the FROM 28 has stored therein pieces of information on shared memories as targets of global shared memories on the networks. More specifically, the FROM 28 has stored therein sets of addresses of global memory areas and directions data transfer associated therewith, as information on shared memories.

Such pieces of information on shared memories are stored in the FROM 28 from an external interface, through the I/F 27 configured as a transfer parameter in-taking interface, and the MPU 26. Also, there may be pieces of information on shared memories taken in as targets of global shared memories, through the network N1, the network N2, or the network N3.

Functionally, the MPU 26 is configured with a first transfer means 26a, a second transfer means 26b, and a third transfer means 26c. And, the first transfer means 26a, the second transfer means 26b, and the third transfer means 26c are each adapted to read pieces of information on global shared memories in the FROM 28, to make the following control actions in accordance with read information on setting.

At the MPU 26, the first transfer means 26a is adapted to operate in accordance with a first transfer period determined by the CNT 90, to have pieces of shared data as stored in global shared memory areas of stations STN21 to STN2n and stations STN31 to STN3n, stored in global shared memory areas of the CM 69 and the CM 71, respectively, with addresses identical to their addresses in those global shared memory areas.

More specifically, the first transfer means 26a operates, at a first transfer timing, to store in the CM 69 those pieces of shared data received from the network N2, by employing the T/R 29, the MAC 30, and the ARB 31. Further, the first transfer means 26a operates, at the first transfer timing, to store in the CM 71 those pieces of shared data received from the network N3, by employing the T/R 76, the MAC 77, and the ARB 78.

Further, at the MPU 26, the first transfer means 26a is adapted to operate in accordance with a second transfer period determined by the CNT 92, to have pieces of shared data as stored in global shared memory areas of stations STN11 to STN1n and stations STN31 to STN3n, stored in global shared memory areas of the CM 67 and the CM 71, respectively, with addresses identical to their addresses in those global shared memory areas.

More specifically, the first transfer means 26a operates, at a third transfer timing, to store in the CM 67 those pieces of shared data received from the network N1, by employing the T/R 21, the MAC 22, and the ARB 23. Further, the first transfer means 26a operates, at the third transfer timing, to store in the CM 71 those pieces of shared data received from the network N3, by employing the T/R 76, the MAC 77, and the ARB 78.

Still more, at the MPU 26, the first transfer means 26a is adapted to operate in accordance with a third transfer period determined by the CNT 94, to have pieces of shared data as stored in global shared memory areas of stations STN11 to STN1n and stations STN21 to STN2n, stored in global shared memory areas of the CM 67 and the CM 69, respectively, with addresses identical to their addresses in those global shared memory areas.

More specifically, the first transfer means 26a operates, at a fifth transfer timing, to store in the CM 67 those pieces of shared data received from the network N1, by employing the T/R 21, the MAC 22, and the ARB 23. Further, the first transfer means 26a operates, at the fifth transfer timing, to store in the CM 69 those pieces of shared data received from the network N2, by employing the T/R 29, the MAC 30, and the ARB 31.

At the MPU 26, the second transfer means 26b is adapted to operate, as the CM 67 has pieces of shared data stored in a global shared memory area thereof by the first transfer means 26a, to store the pieces of shared data in the global shared memory areas of the CM 69 and the CM 71, with addresses identical to their addresses in the global shared memory area of the CM 67.

More specifically, the second transfer means 26b operates to have pieces of shared data as stored in the global shared memory area of the CM 67, stored in a global shared memory area of the CM 69, by employing the ARB 23, the DMA 25, and the ARB 31. Further, the second transfer means 26b operates to have pieces of shared data as stored in the global shared memory area of the CM 69, stored in a global shared memory area of the CM 71, by employing the ARB 31, the DMA 25, and the ARB 78.

Further, at the MPU 26, the second transfer means 26b is adapted to operate, as the CM 69 has pieces of shared data stored in the global shared memory area by the first transfer means 26a, to store the pieces of shared data in the global shared memory areas of the CM 67 and the CM 71, with addresses identical to their addresses in the global shared memory area of the CM 69.

More specifically, the second transfer means 26b operates to have pieces of shared data as stored in the global shared memory area of the CM 69, stored in the global shared memory area of the CM 67, by employing the ARB 31, the DMA 25, and the ARB 23. Further, the second transfer means 26b operates to have pieces of shared data as stored in the global shared memory area of the CM 69, stored in a global shared memory area of the CM 71, by employing the ARB 31, the DMA 25, and the ARB 78.

Still more, at the MPU 26, the second transfer means 26b is adapted to operate, as the CM 71 has pieces of shared data stored in the global shared memory area by the first transfer means 26a, to store the pieces of shared data in the global shared memory areas of the CM 67 and the CM 69, with addresses identical to their addresses in the global shared memory area of the CM 71.

More specifically, the second transfer means 26b operates to have pieces of shared data as stored in the global shared memory area of the CM 71, stored in the global shared memory area of the CM 67, by employing the ARB 78, the DMA 25, and the ARB 23. Further, the second transfer means 26b operates to have pieces of shared data as stored in the global shared memory area of the CM 71, stored in the global shared memory area of the CM 69, by employing the ARB 78, the DMA 25, and the ARB 31.

At the MPU 26, the third transfer means 26c is adapted to operate in accordance with a first transfer period supplied from the WAT 91, to have pieces of shared data as stored in the global shared memory area of the CM 67, stored in global shared memory areas of stations STN11 to STN1n, with addresses identical to their addresses in the global shared memory area of the CM 67.

More specifically, the third transfer means 26c operates, at a second transfer timing, to have pieces of shared data as stored in the global shared memory area of the CM 67, stored in the global shared memory areas of stations STN11 to STN1n, by employing the ARB 23, the MAC 22, and the T/R 21.

Further, at the MPU 26, the third transfer means 26c is adapted to operate in accordance with a second transfer period supplied from the WAT 93, to have pieces of shared data as stored in the global shared memory area of the CM 69, stored in global shared memory areas of stations STN21 to STN2n, with addresses identical to their addresses in the global shared memory area of the CM 69.

More specifically, the third transfer means 26c operates, at a fourth transfer timing, to have pieces of shared data as stored in the global shared memory area of the CM 69, stored in the global shared memory areas of stations STN21 to STN2n, by employing the ARB 31, the MAC 30, and the T/R 29.

Still more, at the MPU 26, the third transfer means 26c is adapted to operate in accordance with a third transfer period supplied from the WAT 95, to have pieces of shared data as stored in the global shared memory area of the CM 71, stored in global shared memory areas of stations STN31 to STN3n, with addresses identical to their addresses in the global shared memory area of the CM 71.

More specifically, the third transfer means 26c operates, at a sixth transfer timing, to have pieces of shared data as stored in the global shared memory area of the CM 71, stored in the global shared memory areas of stations STN31 to STN3n, by employing the ARB 78, the MAC 77, and the T/R 76.

Figure 13:
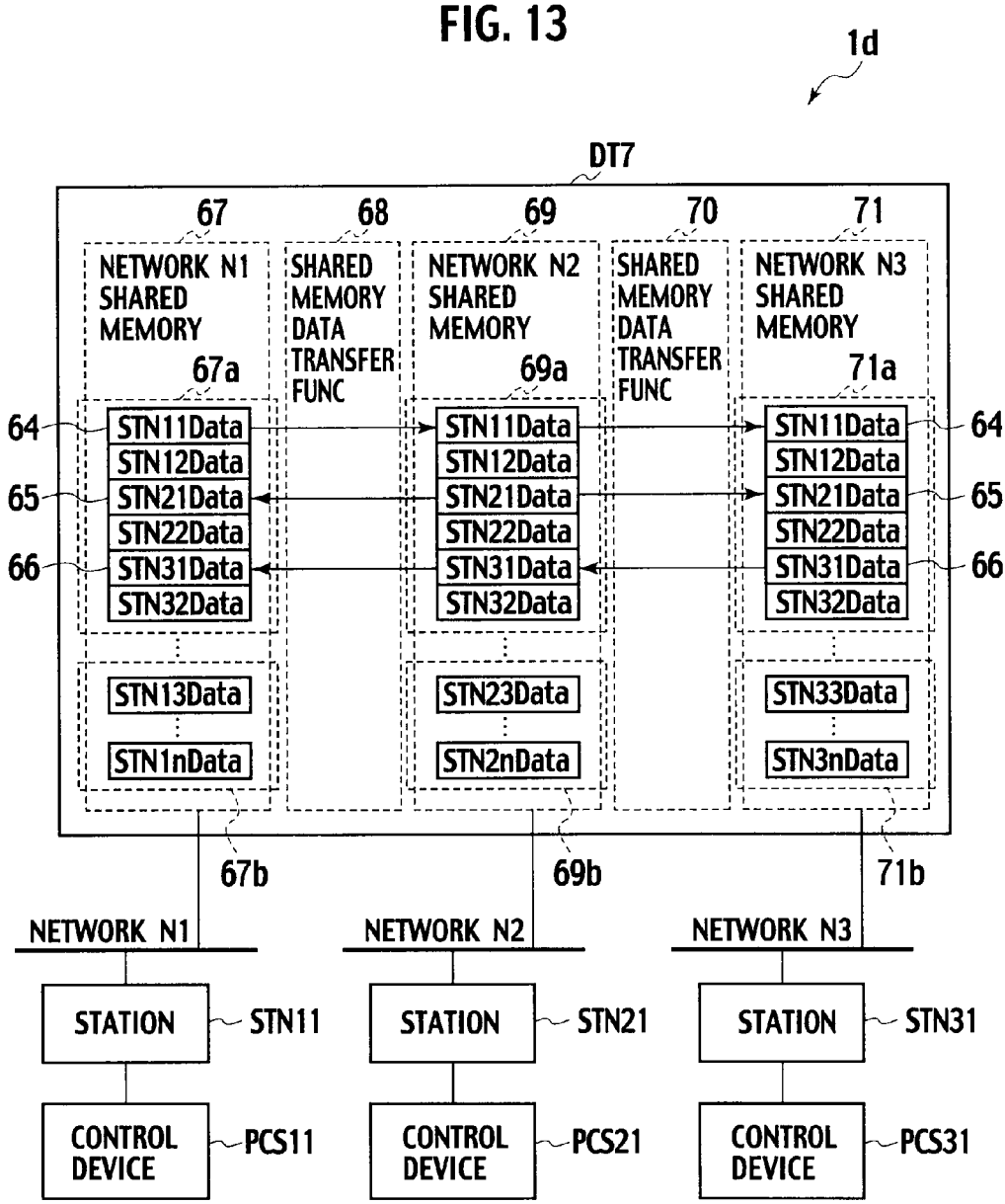
FIG. 13 is a diagram describing data transfer of shared data among networks N1, N2, and N3 in the network control system 1d according to the fourth embodiment of the present invention.

Description is now made of actions of the network control system 1d according to the fourth embodiment of the present invention, with reference to FIG. 13.

FIG. 13 is a diagram describing data transfer of shared data among networks N1, N2, and N3 in the network control system 1d according to the fourth embodiment of the present invention.

In FIG. 13, there is a set of stations STN11 to STN1n connected to the network N1, of which a single station STN11 is depicted for simplified description. Likewise, there is a set of stations STN21 to STN2n connected to the network N2, of which a single station STN21 is depicted, there being a set of stations STN31 to STN3n connected to the network N3, of which a single station STN31 is depicted.

As illustrated in FIG. 13, the data transfer system DT7 is provided with memories shared to be common. Each shared memory is divided into, to set up, a global shared memory area shamble to be common among the networks N1, N2, and N3, and a local shared memory area effective simply within a corresponding one of the networks.

Further, though being not depicted, there is a combination of n stations STN11 to STN1n, n stations STN21 to STN2n, and n stations STN31 to STN3n each respectively including a memory likewise shared, the shared memory being divided into, to set up, a global shared memory area sharable to be common among the networks N1, N2, and N3, and a local shared memory area effective simply within a corresponding one of the networks.

There comes transfer of shared data to stations STN11 to STN with a transfer period referred herein to as a first transfer period, there coming transfer of shared data to stations STN21 to STN2n with a transfer period referred herein to as a second transfer period, and transfer of shared data to stations STN31 to STN3n with a transfer period referred herein to as a third transfer period.

And, the data transfer system DT7 is adapted to work in accordance with the first transfer period, to detect a first transfer timing as a time point of reception of shared data from stations STN21 to STN2n and stations STN31 to STN3n to the data transfer system DT7, and a second transfer timing as a time point of transfer of shared data from the data transfer system DT7 to stations STN11 to STN1n.

Further, the data transfer system DT7 is adapted to work in accordance with the second transfer period, to detect a third transfer timing as a time point of reception of shared data from stations STN11 to STN1n and stations STN31 to STN3n to the data transfer system DT7, and a fourth transfer timing as a time point of transfer of shared data from the data transfer system DT7 to stations STN21 to STN2n.

Still more, the data transfer system DT7 is adapted to work in accordance with the third transfer period, to detect a fifth transfer timing as a time point of reception of shared data from stations STN11 to STN1n and stations STN21 to STN2n to the data transfer system DT7, and a sixth transfer timing as a time point of transfer of shared data from the data transfer system DT7 to stations STN31 to STN3n.

Description is now first made of actions of the network control system 1d along with operation of a control device PCS11 connected with a station STN11 in the network N1 to update a piece of shared data stored in global shared memory areas.

As shown in FIG. 13, in the network N1, a control device PCS11 connected with the station STN11 writes a data "STN11Data" at an address 64 (not depicted) in a shared memory area (as a global shared memory area) of the station STN11, whereby the station STN11 works to transfer the written data "STN11Data" to a whole of stations STN12 to STN1n in the network N1 with the data transfer system DT7 inclusive.

And, the data transfer system DT7 detects a third transfer timing or a fifth transfer timing, whereby it works to receive the transferred shared data "STN11Data", and store the received shared data "STN11Data" at an address 64 in a shared memory area (as a global shared memory area 67a) in the CM 67.

Next, the data transfer system DT7 works to have the shared data "STN11Data", as it is stored at the address 64 in the shared memory area (as the global shared memory area 67a), stored at an address 64 in a shared memory area (as a global shared memory area 69a) thereof. Further, the data transfer system DT7 works to have the shared data "STN11Data", as it is stored at the address 64 in the shared memory area (as the global shared memory area 69a), stored at an address 64 in a shared memory area (as a global shared memory area 71a) thereof.

The data transfer system DT7 detects a fourth transfer timing, whereby it works to transfer the shared data "STN11Data" as stored at the address 64 in the shared memory area (as the global shared memory area 69a) to whole stations STN21 to STN2n (FIG. 13 simply depicts the station STN21) connected to the network N2. And, the stations STN21 to STN2n each respectively have the transferred shared data "STN11Data" stored at an address 64 (not depicted) in a shared memory area (as a global shared memory area) thereof.

Further, the data transfer system DT7 detects a sixth transfer timing, whereby it works to transfer the shared data "STN11Data" as stored at the address 64 in the shared memory area (as the global shared memory area 71a) to whole stations STN31 to STN3n (FIG. 13 simply depicts the station STN31) connected to the network N3. And, the stations STN31 to STN3n each respectively have the transferred shared data "STN11Data" stored at an address 64 (not depicted) in a shared memory area (as a global shared memory area) thereof.

It therefore is possible for a control device PCS21 to read the data "STN11Data" transferred to the station STN21 in the network N2, and for the control device PCS31 to read the data "STN11Data" transferred to the station STN31 in the network N3.

Description is now made of actions of the network control system 1d along with operation of a control device PCS31 connected with a station STN11 in the network N3 to update a piece of shared data stored in global shared memory areas.

As shown in FIG. 13, in the network N3, the control device PCS31 connected with the station STN31 writes a data "STN31Data" at an address 66 (not depicted) in a shared memory area (as a global shared memory area) of the station STN11, whereby the station STN11 works to transfer the written data "STN31Data" to a whole of stations STN32 to STN3n in the network N3 with the data transfer system DT7 inclusive.

And, the data transfer system DT7 detects a first transfer timing or a third transfer timing, whereby it works to receive the transferred shared data "STN31Data", and store the received shared data "STN31Data" at an address 66 in the shared memory area (as the global shared memory area 71a).

Next, the data transfer system DT7 works to have the shared data "STN31Data", as it is stored at the address 66 in the shared memory area (as the global shared memory area 71a), stored at an address 66 in the shared memory area (as the global shared memory area 69a). Further, the data transfer system DT7 works to have the shared data "STN31Data", as it is stored at the address 66 in the shared memory area (as the global shared memory area 69a), stored at an address 66 in the shared memory area (as the global shared memory area 67a).

The data transfer system DT7 detects a fourth transfer timing, whereby it works to transfer the shared data "STN31Data" as stored at the address 66 in the shared memory area (as the global shared memory area 69a) to whole stations STN21 to STN2n (FIG. 13 simply depicts the station STN21) connected to the network N2. And, the stations STN21 to STN2n each respectively have the transferred shared data "STN31Data" stored at an address 66 (not depicted) in a shared memory area (as a global shared memory area) thereof.

Further, the data transfer system DT7 detects a second transfer timing, whereby it works to transfer the shared data "STN31Data" as stored at the address 66 in the shared memory area (as the global shared memory area 67a) to whole stations STN11 to STN1n (FIG. 13 simply depicts the station STN11) connected to the network N1. And, the stations STN11 to STN1n each respectively have the transferred shared data "STN31Data" stored at an address 66 (not depicted) in a shared memory area (as a global shared memory area) thereof.

It therefore is possible for the control device PCS21 to read the data "STN31Data" transferred to the station STN11 in the network N1, and for the control device PCS21 to read the data "STN31Data" transferred to the station STN21 in the network N2.

Such being the case, the data transfer system DT7 is adapted to work for data transfer in accordance with a transfer period of a network at a destination of transfer, affording to eliminate repetition of transfer of a shared data, thus always allowing for transfer of fresh shared data.

As is apparent from the foregoing, according to the fourth embodiment, the network control system 1d permits concentration of data transfer system and reduction of installation place, thus allowing for efficient utilization of global memory areas, with a reduce cost.

Further, the data transfer system DT7 affords to transfer stored data in global memory areas thereof to networks, permitting high-rate transfer of data without transfer delays, even with an increased number of networks connected to the data transfer system DT7.

<Fifth Embodiment>

There is a network control system according to a fifth embodiment of the present invention that includes a data transfer system connected to networks N1 to N3, to implement transfer of data among the networks N1 to N3, like the network control system 1d according to the fourth embodiment of the present invention.

Further, in the network control system according to the fifth embodiment of the present invention, the networks N1 to N3 include stations thereof having their shared memories each divided into sub-areas, by orders of priority of shared data. More specifically, like the network control system 1b according to the second embodiment, each shared memory in the network N1 is divided into classes of transfer rate as set up in three ranks being a high transfer rate block 36, a medium transfer rate block 37, and a low transfer rate block 38. Also in the network N2, each shared memory is divided into prioritized classes likewise set up in three ranks, as well as each shared memory in the network N3.

Figure 14:
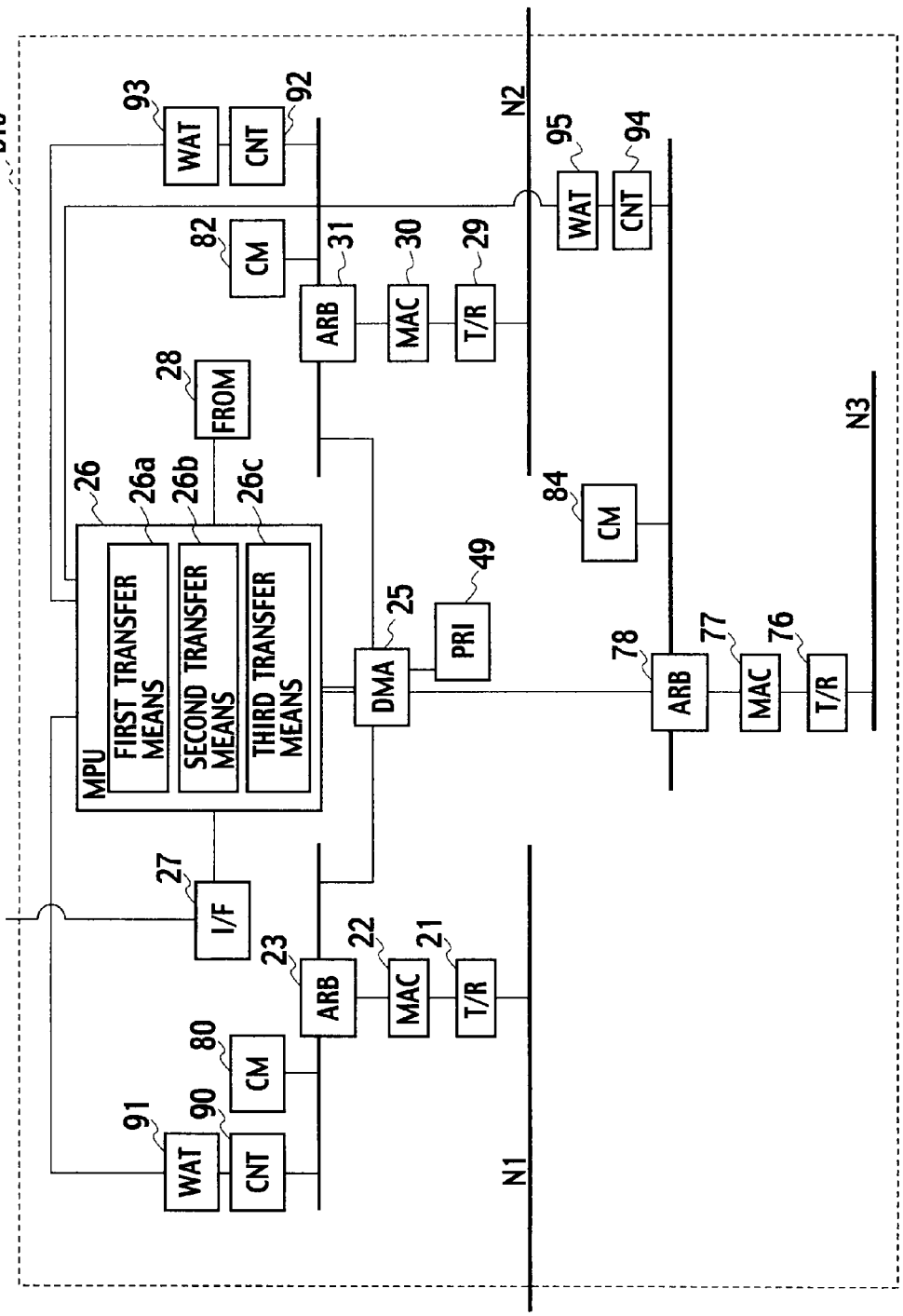
FIG. 14 is a configuration diagram showing a hardware configuration of a data transfer system DT8 in a network control system 1e according to a fifth embodiment.

FIG. 14 is a configuration diagram showing a hardware configuration of the data transfer system DT8 in the network control system 1e according to the fifth embodiment.

As shown in FIG. 14, in the network control system 1e according to the fifth embodiment, the data transfer system DT8 includes a combination of T/R's 21, 29, and 76 configured as transmitter receiver sets, a combination of MAC's 22, 30, and 77 configured as medium access controllers, a combination of ARB's 23, 31, and 78 configured as bus traffic arbitrators, a CM 80 configured as a common memory shared in the network N1, a CM 82 configured as a common memory shared in the network N2, a CM 84 configured as a common memory shared in the network N3, a DMA 25, an MPU 26 configured for central control, an I/F 27 configured as a transfer parameter in-taking interface, an FROM 28 configured as a transfer parameter memory, a combination of CNT's 90, 92, and 94 configured as transfer controllers, and a combination of WAT's 91, 93, and 95 configured as transfer period monitors.

The CM 80 is divided, like the shared memory 50 illustrated in FIG. 5(a), into an area set up as (a global shared memory area 80a) being shamble to be common among the networks N1 to N3, and an area set up as (a local shared memory area 80b) being effective simply within the network N1. Further, the global shared memory area is divided into sub-areas, by orders of priority of shared data, like the shared memory 50 illustrated in FIG. 5(a). More specifically, the global shared memory area is divided into classes of transfer rate as set up in three ranks being a high transfer rate block 36, a medium transfer rate block 37, and a low transfer rate block 38.

The CM 82 is divided, like the shared memory 54 illustrated in FIG. 5(a), into an area set up as (a global shared memory area 82a) being shamble to be common among the networks N1 to N3, and an area set up as (a local shared memory area 82b) being effective simply within the network N2. Further, the global shared memory area is divided into sub-areas, by orders of priority of shared data, like the shared memory 54 illustrated in FIG. 5(a). More specifically, the global shared memory area is divided into classes of transfer rate as set up in three ranks being a high transfer rate block 36, a medium transfer rate block 37, and a low transfer rate block 38.

The CM 84 is divided, like a shared memory 58 illustrated in FIG. 5(a), into an area set up as (a global shared memory area 84a) being sharable to be common among the networks N1 to N3, and an area set up as (a local shared memory area 84b) being effective simply within the network N3. Further, the global shared memory area is divided into sub-areas, by orders of priority of shared data, like the shared memory 58 illustrated in FIG. 5(a). More specifically, the global shared memory area is divided into classes of transfer rate as set up in three ranks being a high transfer rate block 36, a medium transfer rate block 37, and a low transfer rate block 38.

There is a PRI 49 configured to store therein, as pieces of information on order of priority, respective orders of priorities in transfer of shared data between the data transfer system DT8 and sets of stations STN11 to STN1n, stations STN21 to STN2n, and stations STN31 to STN3n. The priority order information stored includes sets of addresses of global shared memory areas and associated orders of priorities each representing a high rate, a medium rate, or a low rate.

The CNT 90 is configured to read a piece of information on order of priority from the PRI 149, and work on the basis of priority order information, to determine a first transfer period as a transfer period in transfer of shared data from the data transfer system DT8 to stations STN11 to STN1n. More specifically, the CNT 90 selects a transfer period according to the priority order information representing a high rate, a medium rate, or a low rate, to provide the selected transfer period as a first transfer period.

The WAT 91 is configured to work in accordance with the first transfer period determined by the CNT 90, to detect a time point of transfer of shared data from the data transfer system DT8 to stations STN11 to STN1n, as a second transfer timing. Further, the WAT 91 is configured to detect a time point of reception of shared data from any of stations STN21 to STN2n and stations STN31 to STN3n to the data transfer system DT8, as a first transfer timing to be a time point earlier than the second transfer timing by a prescribed time interval. And, the WAT 91 is adapted to work upon detection of the first transfer timing or the second transfer timing, to supply the MPU 26 with a signal representing the detection.

The CNT 92 is configured to read a piece of information on order of priority from the PRI 149, and work on the basis of information on priority order, to determine a second transfer period as a transfer period in transfer of shared data from the data transfer system DT8 to stations STN21 to STN2n. More specifically, the CNT 92 selects a transfer period according to the priority order information representing a high rate, a medium rate, or a low rate, to provide the selected transfer period as a second transfer period.

The WAT 93 is configured to work in accordance with the second transfer period determined by the CNT 92, to detect a time point of transfer of shared data from the data transfer system DT8 to stations STN21 to STN2n, as a fourth transfer timing. Further, the WAT 93 is configured to detect a time point of transfer of shared data from any of stations STN11 to STN1n and stations STN31 to STN3n to the data transfer system DT8, as a third transfer timing to be a time point earlier than the fourth transfer timing by a prescribed time interval. And, the WAT 93 is adapted to work upon detection of the third transfer timing or the fourth transfer timing, to supply the MPU 26 with a signal representing the detection.

The CNT 94 is configured to read a piece of information on order of priority from the PRI 149, and work on the basis of information on priority order, to determine a third transfer period as a transfer period in transfer of shared data from the data transfer system DT8 to stations STN31 to STN3n. More specifically, the CNT 94 selects a transfer period according to the priority order information representing a high rate, a medium rate, or a low rate, to provide the selected transfer period as a third transfer period.

The WAT 95 is configured to work in accordance with the third transfer period determined by the CNT 94, to detect a time point of transfer of shared data from the data transfer system DT8 to stations STN31 to STN3n, as a sixth transfer timing. Further, the WAT 95 is configured to detect a time point of transfer of shared data from any of stations STN11 to STN1n and stations STN21 to STN2n to the data transfer system DT8, as a fifth transfer timing to be a time point earlier than the sixth transfer timing by a prescribed time interval. And, the WAT 95 is adapted to work upon detection of the fifth transfer timing or the sixth transfer timing, to supply the MPU 26 with a signal representing the detection.

Functionally, the MPU 26 is configured with a first transfer means 26a, a second transfer means 26b, and a third transfer means 26c. And, the first transfer means 26a, the second transfer means 26b, and the third transfer means 26c are each adapted to read pieces of information on global shared memories in the FROM 28, to make the following control actions in accordance with read information on setting.

At the MPU 26, the first transfer means 26a is adapted to operate in accordance with a first transfer period determined by the CNT 90, to have pieces of shared data as stored in global shared memory areas of stations STN21 to STN2n and stations STN31 to STN3n, stored in global shared memory areas of the CM 82 and the CM 84, respectively, with addresses identical to their addresses in those global shared memory areas.

More specifically, the first transfer means 26a operates, at a first transfer timing, to store in the CM 82 those pieces of shared data received from the network N2, by employing the T/R 29, the MAC 30, and the ARB 31. Further, the first transfer means 26a operates, at the first transfer timing, to store in the CM 84 those pieces of shared data received from the network N3, by employing the T/R 76, the MAC 77, and the ARB 78.

Further, at the MPU 26, the first transfer means 26a is adapted to operate in accordance with a second transfer period determined by the CNT 92, to have pieces of shared data as stored in global shared memory areas of stations STN11 to STN1n and stations STN31 to STN3n, stored in global shared memory areas of the CM 80 and the CM 84, respectively, with addresses identical to their addresses in those global shared memory areas.

More specifically, the first transfer means 26a operates, at a third transfer timing, to store in the CM 80 those pieces of shared data received from the network N1, by employing the T/R 21, the MAC 22, and the ARB 23. Further, the first transfer means 26a operates, at the third transfer timing, to store in the CM 84 those pieces of shared data received from the network N3, by employing the T/R 76, the MAC 77, and the ARB 78.

Still more, at the MPU 26, the first transfer means 26a is adapted to operate in accordance with a third transfer period determined by the CNT 94, to have pieces of shared data as stored in global shared memory areas of stations STN11 to STN1n and stations STN21 to STN2n, stored in global shared memory areas of the CM 80 and the CM 82, respectively, with addresses identical to their addresses in those global shared memory areas.

More specifically, the first transfer means 26a operates, at a fifth transfer timing, to store in the CM 80 those pieces of shared data received from the network N1, by employing the T/R 21, the MAC 22, and the ARB 23. Further, the first transfer means 26a operates, at the fifth transfer timing, to store in the CM 82 those pieces of shared data received from the network N2, by employing the T/R 29, the MAC 30, and the ARB 31.

At the MPU 26, the second transfer means 26b is adapted to operate, as the CM 80 has pieces of shared data stored in a global shared memory area thereof by the first transfer means 26a, to store the pieces of shared data in the global shared memory areas of the CM 82 and the CM 84, with addresses identical to their addresses in the global shared memory area of the CM 80.

More specifically, the second transfer means 26b operates to have pieces of shared data as stored in the global shared memory area of the CM 80, stored in a global shared memory area of the CM 82, by employing the ARB 23, the DMA 25, and the ARB 31. Further, the second transfer means 26b operates to have pieces of shared data as stored in the global shared memory area of the CM 82, stored in a global shared memory area of the CM 84, by employing the ARB 31, the DMA 25, and the ARB 78.

Further, at the MPU 26, the second transfer means 26b is adapted to operate, as the CM 82 has pieces of shared data stored in the global shared memory area by the first transfer means 26a, to store the pieces of shared data in the global shared memory areas of the CM 80 and the CM 784, with addresses identical to their addresses in the global shared memory area of the CM 82.

More specifically, the second transfer means 26b operates to have pieces of shared data as stored in the global shared memory area of the CM 82, stored in the global shared memory area of the CM 80, by employing the ARB 31, the DMA 25, and the ARB 23. Further, the second transfer means 26b operates to have pieces of shared data as stored in the global shared memory area of the CM 82, stored in a global shared memory area of the CM 84, by employing the ARB 31, the DMA 25, and the ARB 78.

Still more, at the MPU 26, the second transfer means 26b is adapted to operate, as the CM 84 has pieces of shared data stored in the global shared memory area by the first transfer means 26a, to store the pieces of shared data in the global shared memory areas of the CM 80 and the CM 82, with addresses identical to their addresses in the global shared memory area of the CM 84.

More specifically, the second transfer means 26b operates to have pieces of shared data as stored in the global shared memory area of the CM 84, stored in the global shared memory area of the CM 80, by employing the ARB 78, the DMA 25, and the ARB 23. Further, the second transfer means 26b operates to have pieces of shared data as stored in the global shared memory area of the CM 84, stored in the global shared memory area of the CM 82, by employing the ARB 78, the DMA 25, and the ARB 31.

At the MPU 26, the third transfer means 26c is adapted to operate in accordance with a first transfer period supplied from the WAT 91, to have pieces of shared data as stored in the global shared memory area of the CM 80, stored in global shared memory areas of stations STN11 to STN1n, with addresses identical to their addresses in the global shared memory area of the CM 80.

More specifically, the third transfer means 26c operates, at a second transfer timing, to have pieces of shared data as stored in the global shared memory area of the CM 80, stored in the global shared memory areas of stations STN11 to STN1n, by employing the ARB 23, the MAC 22, and the T/R 21.

Further, at the MPU 26, the third transfer means 26c is adapted to operate in accordance with a second transfer period supplied from the WAT 93, to have pieces of shared data as stored in the global shared memory area of the CM 82, stored in global shared memory areas of stations STN21 to STN2n, with addresses identical to their addresses in the global shared memory area of the CM 82.

More specifically, the third transfer means 26c operates, at a fourth transfer timing, to have pieces of shared data as stored in the global shared memory area of the CM 82, stored in the global shared memory areas of stations STN21 to STN2n, by employing the ARB 31, the MAC 30, and the T/R 29.

Still more, at the MPU 26, the third transfer means 26c is adapted to operate in accordance with a third transfer period supplied from the WAT 95, to have pieces of shared data as stored in the global shared memory area of the CM 84, stored in global shared memory areas of stations STN31 to STN3n, with addresses identical to their addresses in the global shared memory area of the CM 84.

More specifically, the third transfer means 26c operates, at a sixth transfer timing, to have pieces of shared data as stored in the global shared memory area of the CM 84, stored in the global shared memory areas of stations STN31 to STN3n, by employing the ARB 78, the MAC 77, and the T/R 76.

Figure 15:
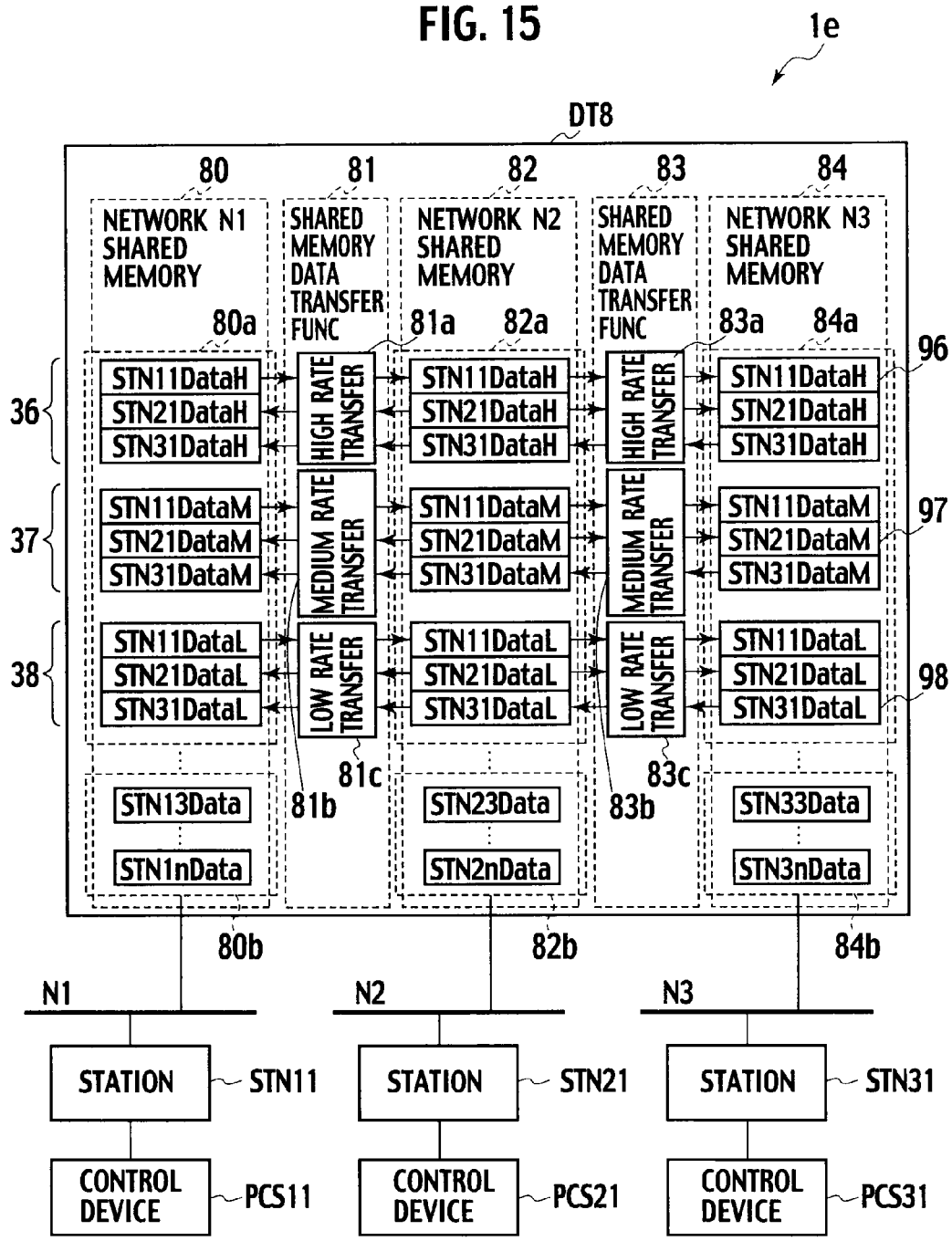
FIG. 15 is a diagram describing data transfer of shared data among networks N1, N2, and N3 in the network control system 1e according to the fifth embodiment of the present invention.

Description is now made of actions of the network control system 1e according to the fifth embodiment of the present invention, with reference to FIG. 15.

FIG. 15 is a diagram describing data transfer of shared data among networks N1, N2, and N3 in the network control system 1e according to the fifth embodiment of the present invention.

In FIG. 15, there is a set of stations STN11 to STN1n connected to the network N1, of which a single station STN11 is depicted for simplified description. Likewise, there is a set of stations STN21 to STN2n connected to the network N2, of which a single station STN21 is depicted, there being a set of stations STN31 to STN3n connected to the network N3, of which a single station STN31 is depicted.

As illustrated in FIG. 15, the data transfer system DT8 includes the CM's 80, 82, and 84 as memories shared to be common. Each shared memory is divided into, to set up, a global shared memory area sharable to be common among the networks N1, N2, and N3, and a local shared memory area effective simply within a corresponding one of the networks.

Further, though being not depicted, there is a combination of n stations STN11 to STN1n, n stations STN21 to STN2n, and n stations STN31 to STN3n each respectively including a memory likewise shared, the shared memory being divided into, to set up, a global shared memory area shamble to be common among the networks N1, N2, and N3, and a local shared memory area effective simply within a corresponding one of the networks.

There comes transfer of shared data to stations STN11 to STN1n with a transfer period referred herein to as a first transfer period, there coming transfer of shared data to stations STN21 to STN2n with a transfer period referred herein to as a second transfer period, and transfer of shared data to stations STN31 to STN3n with a transfer period referred herein to as a third transfer period. The first transfer period is determined in correspondence to a piece of information on priority order representing a high rate, a medium rate, or a low rate. Likewise, the second transfer period and the third transfer period also are each determined in correspondence to a piece of information on priority order representing a high rate, a medium rate, or a low rate.

And, the data transfer system DT8 is adapted to work in accordance with the first transfer period, to detect a first transfer timing as a time point of reception of shared data from stations STN21 to STN2n and stations STN31 to STN3n to the data transfer system DT8, and a second transfer timing as a time point of transfer of shared data from the data transfer system DT8 to stations STN11 to STN1n.

Further, the data transfer system DT8 is adapted to work in accordance with the second transfer period, to detect a third transfer timing as a time point of reception of shared data from stations STN11 to STN1n and stations STN31 to STN3n to the data transfer system DT8, and a fourth transfer timing as a time point of transfer of shared data from the data transfer system DT8 to stations STN21 to STN2n.

Still more, the data transfer system DT8 is adapted to work in accordance with the third transfer period, to detect a fifth transfer timing as a time point of reception of shared data from stations STN11 to STN1n and stations STN21 to STN2n to the data transfer system DT8, and a sixth transfer timing as a time point of transfer of shared data from the data transfer system DT8 to stations STN31 to STN3n.

Description is now first made of actions of the network control system 1e along with operation for a control device PCS11 connected with a station STN11 in the network N1 to update a piece of shared data stored in global shared memory areas.

As shown in FIG. 15, in the network N1, the control device PCS11 connected with the station STN11 writes a data "STN11DataH" at an address 96 (not depicted) in a high transfer rate block 36 of a shared memory area (as a global shared memory area) of the station STN11, whereby the station STN11 works to high-rate transfer the written data "STN11DataH" to a whole of stations STN12 to STN1n in the network N1 with the data transfer system DT8 inclusive.

And, the data transfer system DT8 detects a third transfer timing or a fifth transfer timing, whereby it works to receive the transferred shared data "STN11DataH", and store the received shared data "STN11DataH" at an address 96 in a high transfer rate block 36 of a shared memory area (as a global shared memory area 80*a*) thereof.

Next, the data transfer system DT8 works to have the shared data "STN11DataH", as it is stored at the address 96 in the shared memory area (as the global shared memory area 80*a*), stored at an address 96 in a high transfer rate block 36 of a shared memory area (as a global shared memory area 82*a*) thereof. Further, the data transfer system DT8 works to have the shared data "STN11DataH", as it is stored at the address 96 in the shared memory area (as the global shared memory area 82*a*), stored at an address 96 in a high transfer rate block 36 of a shared memory area (as a global shared memory area 84*a*) thereof.

The data transfer system DT8 detects a fourth transfer timing, whereby it works to high-rate transfer the shared data "STN11DataH" as stored at the address 96 in the high transfer rate block 36 of the shared memory area (as the global shared memory area 82*a*) to whole stations STN21 to STN2*n* (FIG. 15 simply depicts the station STN21) connected to the network N2. And, the stations STN21 to STN2*n* each respectively have the transferred shared data "STN11DataH" stored at an address 96 (not depicted) in a shared memory area (as a global shared memory area) thereof.

Further, the data transfer system DT8 detects a sixth transfer timing, whereby it works to high-rate transfer the shared data "STN11DataH" as stored at the address 96 in the high transfer rate block 36 of the shared memory area (as the global shared memory area 84*a*) to whole stations STN31 to STN3*n* (FIG. 15 simply depicts the station STN31) connected to the network N3. And, the stations STN31 to STN3*n* each respectively have the transferred shared data "STN11DataH" stored at an address 96 (not depicted) in a high transfer rate block 36 of a shared memory area (as a global shared memory area) thereof.

It therefore is possible for a control device PCS21 to read the data "STN11DataH" transferred to the station STN21 in the network N2, and for a control device PCS31 to read the data "STN11DataH" transferred to the station STN31 in the network N3.

Description is now made of actions of the network control system 1*e* along with operation for a control device PCS31 connected with a station STN31 in the network N3 to update a piece of shared data stored in global shared memory areas.

As shown in FIG. 15, in the network N3, the control device PCS31 connected with the station STN31 writes a data "STN31DataL" at an address 98 (not depicted) in a low transfer rate block 38 of a shared memory area (as a global shared memory area) of the station STN31, whereby the station STN31 works to low-rate transfer the written data "STN31DataL" to a whole of stations STN32 to STN3*n* in the network N3 with the data transfer system DT8 inclusive.

And, the data transfer system DT8 detects a first transfer timing or a third transfer timing, whereby it works to receive the transferred shared data "STN31DataL", and store the received shared data "STN31DataL" at an address 98 in a low transfer rate block 38 of a shared memory area (as a global shared memory area 84*a*) thereof.

Next, the data transfer system DT8 works to have the shared data "STN31DataL", as it is stored at the address 98 in the low transfer rate block 38 of the shared memory area (as the global shared memory area 84*a*), stored at an address 98 in a low transfer rate block 38 of the shared memory area (as the global shared memory area 82*a*). Further, the data transfer system DT8 works to have the shared data "STN31DataL", as it is stored at the address 98 in the shared memory area (as the global shared memory area 82*a*), stored at an address 98 in a low transfer rate block 38 of the shared memory area (as the global shared memory area 80*a*).

The data transfer system DT8 detects a fourth transfer timing, whereby it works to low-rate transfer the shared data "STN31DataL" as stored at the address 98 in the low transfer rate block 38 of the shared memory area (as the global shared memory area 82*a*) to whole stations STN21 to STN2*n* (FIG. 15 simply depicts the station STN21) connected to the network N2. And, the stations STN21 to STN2*n* each respectively have the transferred shared data "STN31DataL" stored at an address 98 (not depicted) in a low transfer rate block 38 of a shared memory area (as a global shared memory area) thereof.

Further, the data transfer system DT8 detects a second transfer timing, whereby it works to transfer the shared data "STN31DataL" as stored at the address 98 in the low transfer rate block 38 of the shared memory area (as the global shared memory area 80*a*) to whole stations STN11 to STN1*n* (FIG. 15 simply depicts the station STN11) connected to the network N1. And, the stations STN11 to STN1*n* each respectively have the transferred shared data "STN31DataL" stored at an address 98 (not depicted) in a low transfer rate block 38 of a shared memory area (as a global shared memory area) thereof.

It therefore is possible for a control device PCS11 to read the data "STN31DataL" transferred to the station STN11 in the network N1, and for a control device PCS21 to read the data "STN31DataL" transferred to the station STN21 in the network N2.

Such being the case, according to the fifth embodiment, the network control system 1*e* is adapted in addition to effects of the network control system 1*d* according to the fourth embodiment, to have a plurality of transfer rates set for transfer of shared data among networks, allowing for the more enhanced efficiency in use of the networks.

<Sixth Embodiment

Figure 16:
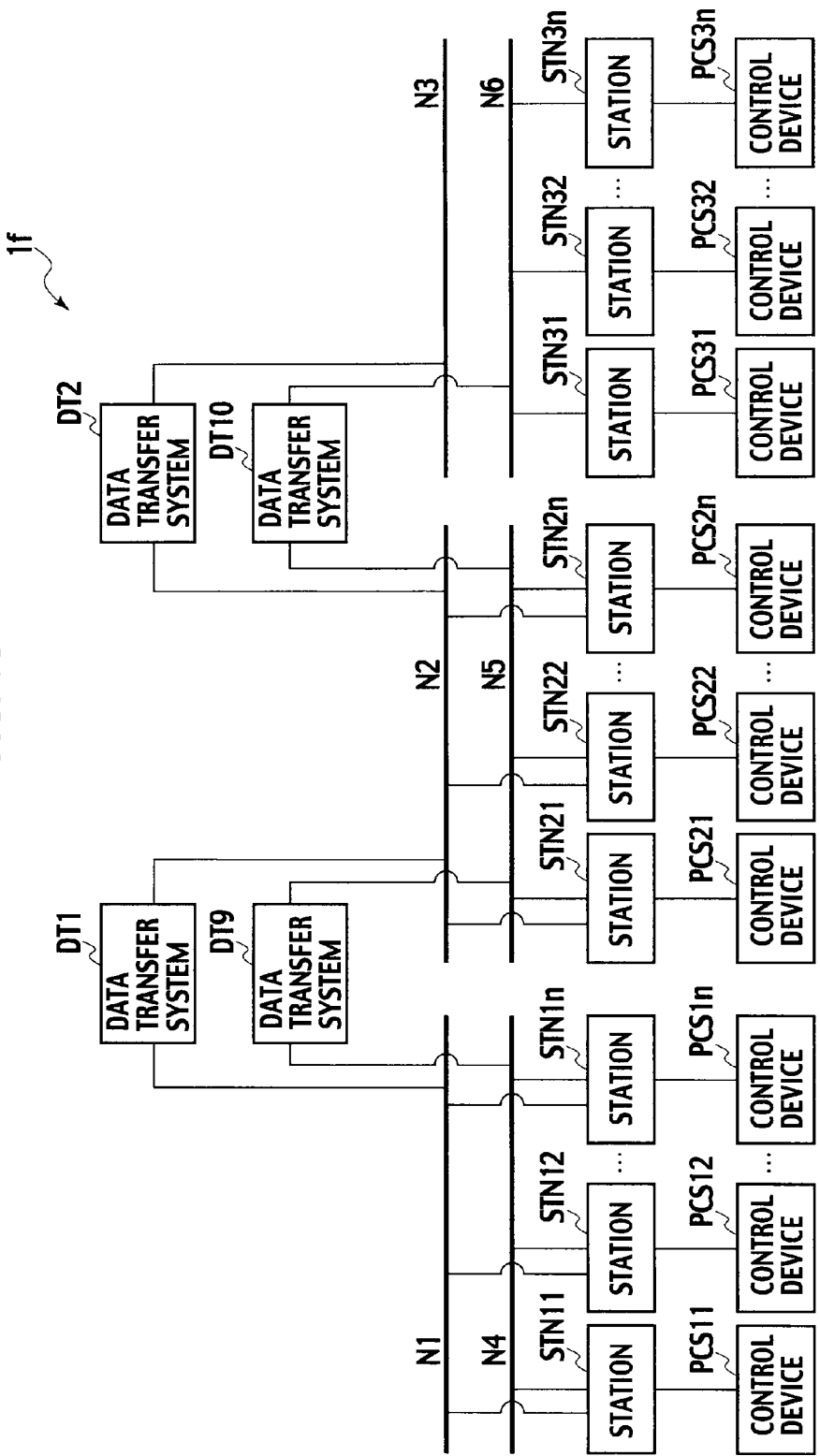
FIG. 16 is a configuration diagram showing a system configuration of a network control system 1f according to a sixth embodiment.

FIG. 16 is a configuration diagram illustrating a system configuration of a network control system 1*f* according to a sixth embodiment.

As illustrated in FIG. 16, the network control system 1*f* according to the sixth embodiment includes a data transfer system DT9, and a data transfer system DT10, in addition to a configuration of network control system 1 according to the first embodiment.

The data transfer system DT9 is connected to stations STN11 to STN1*n* through a network N4, the data transfer system DT9 and the data transfer system DT10 being connected to stations STN21 to STN2*n* through a network N5, the data transfer system DT10 being connected to stations STN31 to STN3*n* through a network N6.

As illustrated in FIG. 16, the network control system 1*f* according to the sixth embodiment is rendered redundant with networks N1 to N3 constituting an A line, and the networks N4 to N6 constituting a B line, to provide wholly duplex network transfer routes. It is likewise rendered redundant with data transfer systems DT1 and DT2 for services in the A line, and the data transfer systems DT9 and DT10 for services in the B line.

The data transfer system DT1 is always put into a service for data transfer in the A line, as well as the data transfer system DT9 at a service in the B line. Also, the data transfer system DT2 is always put into a service for data transfer in the A line, as well as the data transfer system DT10 at a service in the B line. It is a station at a reception end that determines which line to select for use of data.

That is, at a reception end of the network N1, there is one of stations STN11 to STN1*n* selecting a normal data out of received data for use. As being given normal data from both lines, it employs data from the A line. Likewise, at a reception end of the network N2, there is one of stations STN21 to STN2n selecting a normal data out of received data for use. As being given normal data from both lines, it employs data from the A line. Further, at a reception end of the network N3, there is one of stations STN31 to STN3n selecting a normal data out of received data for use. As being given normal data from both lines, it employs data from the A line.

Such being the case, according to the sixth embodiment, the network control system 1f allows for an enhanced availability factor due to duplication, besides a system configuration with cost-reducing simplification, an enhanced network transfer efficiency, and a facilitated engineering.

<Seventh Embodiment>

Figure 17:
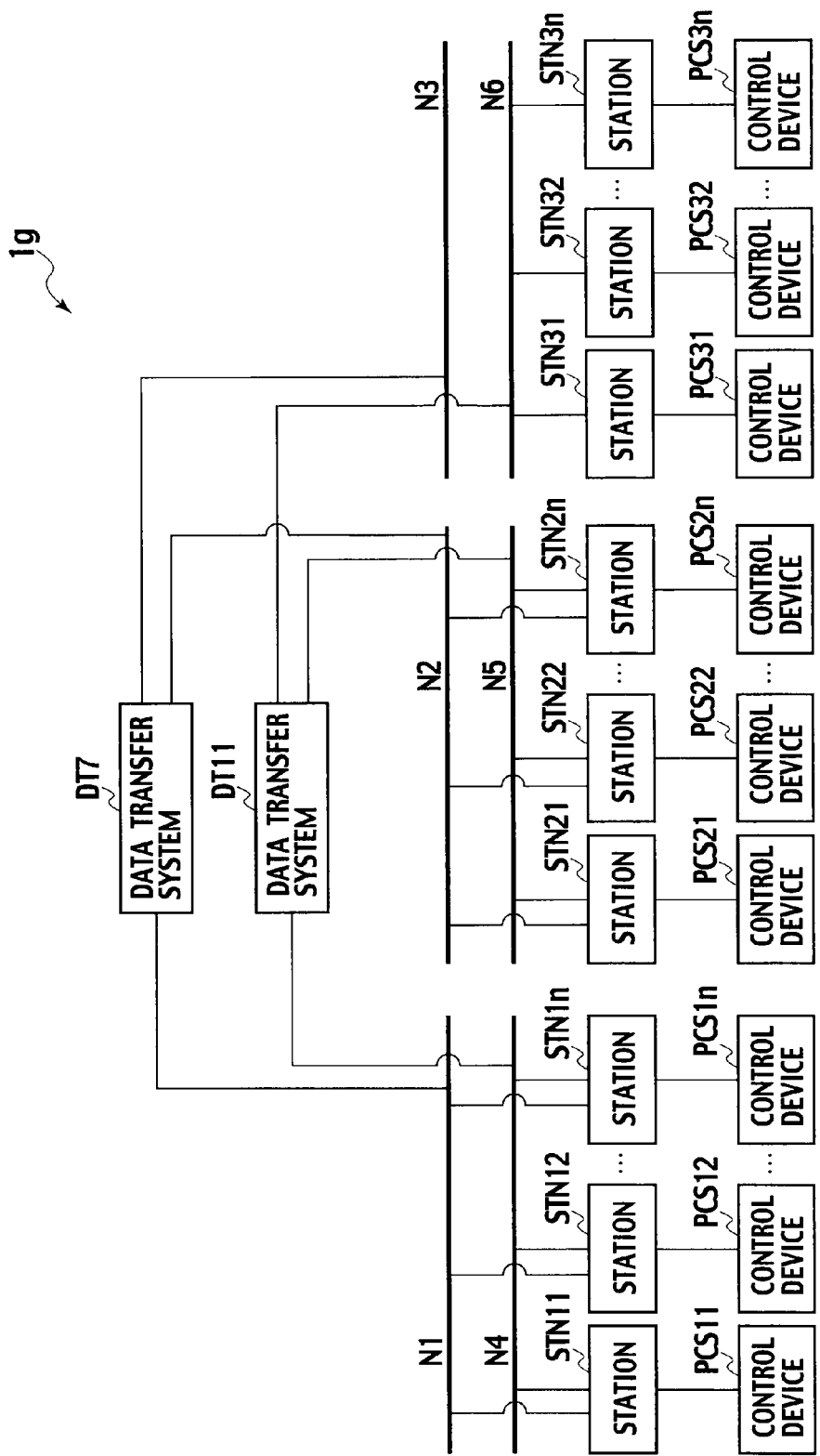
FIG. 17 is a configuration diagram showing a system configuration of a network control system 1g according to a seventh embodiment.
Figure 18:
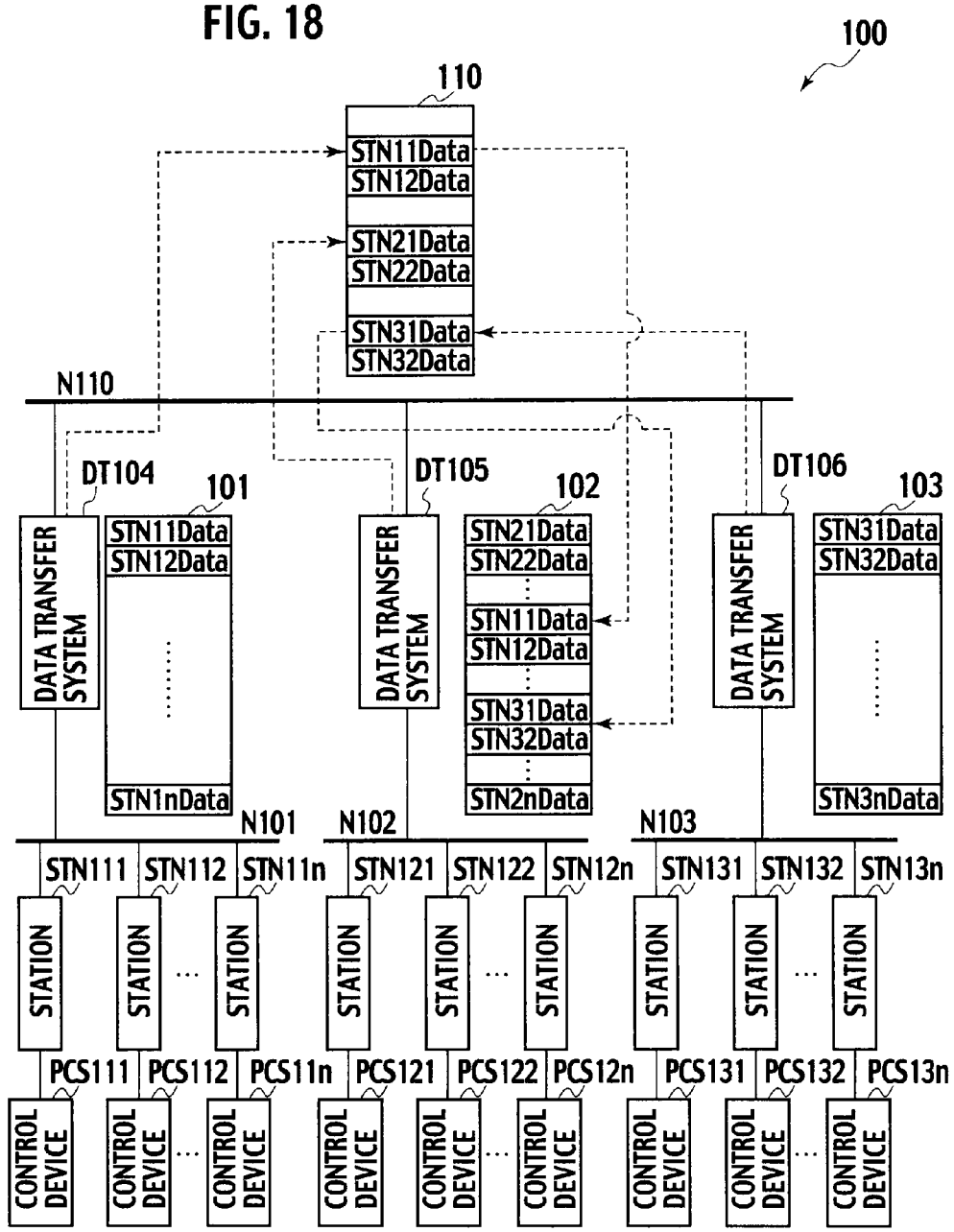
FIG. 18 is a conceptual diagram showing a concept of data transfer in a plant control system in the past
Figure 19:
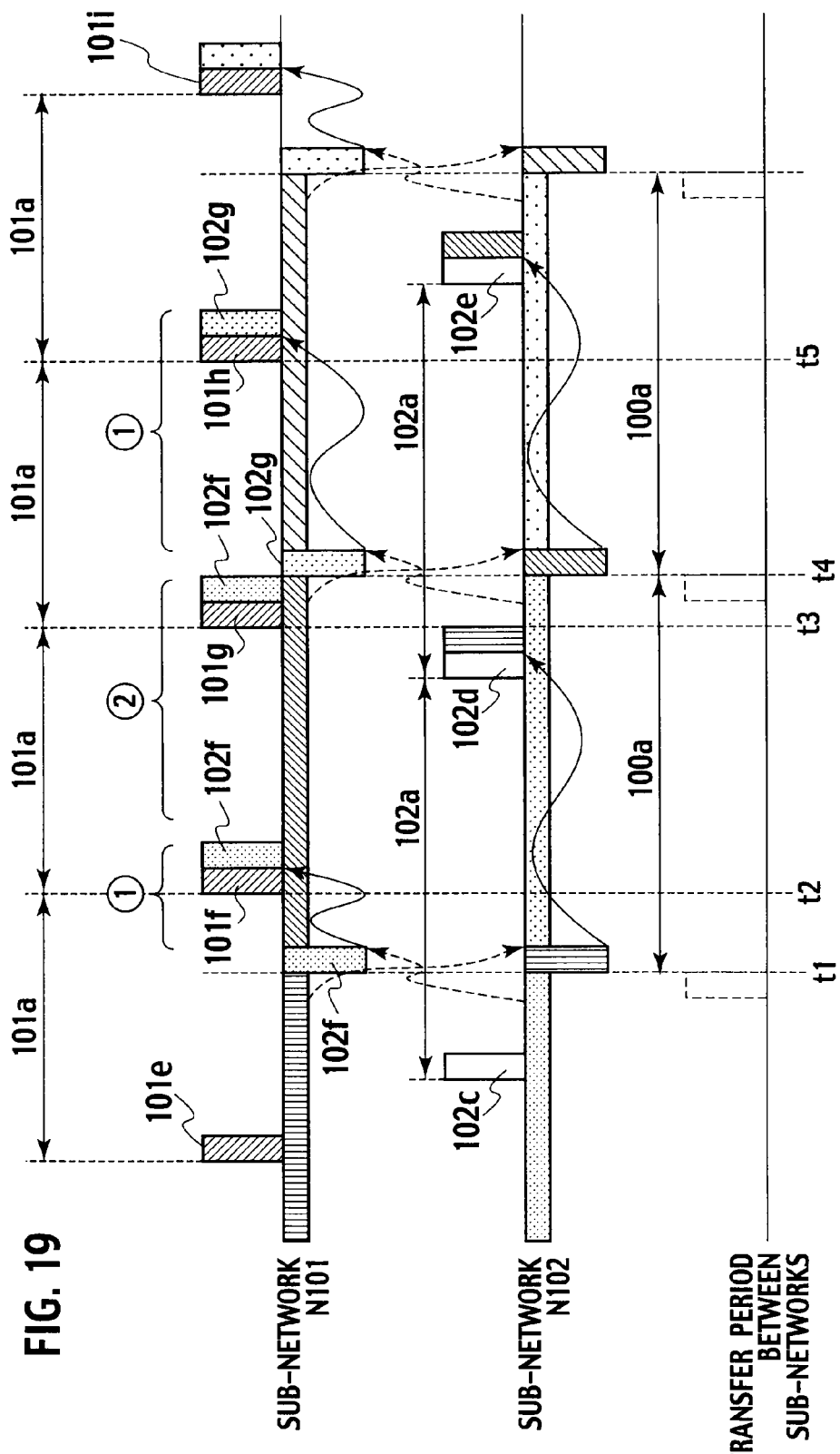
FIG. 19 is a time chart showing data transfer timings for transfer of data from a sub-network to another sub-network.

FIG. 17 is a configuration diagram illustrating a system configuration of a network control system 1g according to a seventh embodiment.

As illustrated in FIG. 17, the network control system 1g according to the seventh embodiment includes a data transfer system DT11 in addition to a configuration of network control system 1d according to the fourth embodiment, The data transfer system DT11 is connected to stations STN11 to STN1n through a network N4, the data transfer system DT11 being connected to stations STN21 to STN2n through a network N5, the data transfer system DT11 being connected to stations STN31 to STN3n through a network N6.

As illustrated in FIG. 17, the network control system 1g according to the seventh embodiment is rendered redundant with networks N1 to N3 constituting an A line, and the networks N4 to N6 constituting a B line, to provide wholly duplex network transfer routes. It is likewise rendered redundant with a data transfer system DT7 for services in the A line, and the data transfer system DT11 for services in the B line.

The data transfer system DT7 is always put into a service for data transfer in the A line, as well as the data transfer system DT11 at a service in the B line. It is a station at a reception end that determines which line to select for use of data.

That is, at a reception end of the network N1, there is one of stations STN11 to STN1n selecting a normal data out of received data for use. As being given normal data from both lines, it employs data from the A line. Likewise, at a reception end of the network N2, there is one of stations STN21 to STN2n selecting a normal data out of received data for use. As being given normal data from both lines, it employs data from the A line. Further, at a reception end of the network N3, there is one of stations STN31 to STN3n selecting a normal data out of received data for use. As being given normal data from both lines, it employs data from the A line.

Such being the case, according to the seventh embodiment, the network control system 1g allows for an enhanced availability factor due to duplication, besides a system configuration with cost-reducing simplification, an enhanced network transfer efficiency, and a facilitated engineering.

The invention claimed is:

1. A network control system for data transfer of shared data between a first control device and a second control device, the network control system comprising:
   a first station controlling data transfer to the first control device adapted to control equipment as a target thereunder;
   a second station controlling data transfer to the second control device adapted to control equipment as a target thereunder; and
   a data transfer system connected to the first station through a first network and connected to the second station through a second network, wherein
   the first station has a first memory storing a first shared data as one of the shared data,
   the second station has a second memory storing a second shared data as one of the shared data, and
   the data transfer system includes
      a third memory storing a third shared data as one of the shared data,
      a fourth memory storing a fourth shared data as one of the shared data,
      a first transfer period determiner determining a first transfer period as a transfer period for transfer of the third shared data from the data transfer system to the first station,
      a second transfer period determiner determining a second transfer period as a transfer period for transfer of the fourth shared data from the data transfer system to the second station,
      a first transfer element operating at a first transfer timing to be a time point earlier than a second transfer timing determined in accordance with the first transfer period, to have the second shared data as stored in the second memory, stored as the fourth shared data in the fourth memory with an address identical to an address thereof in the second memory, and operating at a third transfer timing to be a time point earlier than a fourth transfer timing determined in accordance with the second transfer period, to have the first shared data as stored in the first memory, stored as the third shared data in the third memory with an address identical to an address thereof in the first memory in accordance with setting information,
      a second transfer element operating as the third shared data is stored by the first transfer element, to have this third shared data stored as the fourth shared data in the fourth memory with an address identical to an address thereof in the third memory, and operating as the fourth shared data is stored by the first transfer element, to have this fourth shared data stored as the third shared data in the third memory with an address identical to an address thereof in the fourth memory in accordance with the setting information, and
      a third transfer element operating at the fourth transfer timing, to have the fourth shared data as stored in the fourth memory, stored as the second shared data in the second memory with an address identical to an address thereof in the fourth memory, and operating at the second transfer timing, to have the third shared data as stored in the third memory, stored as the first shared data in the first memory with an address identical to an address thereof in the third memory in accordance with the setting information, wherein
   at least one of the first memory, the second memory, the third memory, and the fourth memory is a non-transitory tangible computer-readable storage medium.

2. The network control system according to claim 1, wherein
   the data transfer system further includes a sixth memory storing therein sets of addresses of the shared data in the first memory, the second memory, the third memory, or the fourth memory and pieces of information on attributes of being shared data in association therewith, as the setting information, and
   the data transfer system has the shared data stored in the first memory, the second memory, the third memory, or the fourth memory in accordance with the setting information stored in the sixth memory.

3. The network control system according to claim 1, further comprising a second data transfer system connected to the first station through the first network and connected to the second station through the second network, having an identical configuration to the data transfer system.

4. The network control system according to claim 2, further comprising a second data transfer system connected to the first station through the first network and connected to the second station through the second network, having an identical configuration to the data transfer system.

5. A network control system for data transfer of shared data between a first control device and a second control device, the network control system comprising:
   a first station controlling data transfer to the first control device adapted to control equipment as a target thereunder;
   a second station controlling data transfer to the second control device adapted to control equipment as a target thereunder; and
   a data transfer system connected to the first station through a first network and connected to the second station through a second network, wherein
   the first station has a first memory storing a first shared data as one of the shared data for each of orders of priority in transfer thereof between the data transfer system and the first station,
   the second station has a second memory storing a second shared data as one of the shared data for each of orders of priority in transfer thereof between the data transfer system and the second station, and
   the data transfer system includes
   a third memory storing a third shared data as one of the shared data for each of orders of priority in transfer thereof between the data transfer system and the first station,
   a fourth memory storing a fourth shared data as one of the shared data for each of orders of priority in transfer thereof between the data transfer system and the second station,
   a fifth memory storing therein sets of orders of priority in transfer of the shared data between the data transfer system and the first station and between the data transfer system and the second station, as priority order information,
   a first transfer period determiner reading a piece of the priority order information from the fifth memory, and operating on a basis of this priority order information to determine a first transfer period as a transfer period for transfer of the third shared data from the data transfer system to the first station,
   a second transfer period determiner reading a piece of the priority order information from the fifth memory, and operating on a basis of this priority order information to determine a second transfer period as a transfer period for transfer of the fourth shared data from the data transfer system to the second station,
   a first transfer element operating at a first transfer timing to be a time point earlier than a second transfer timing determined in accordance with the first transfer period, to have the second shared data as stored in the second memory, stored as the fourth shared data in the fourth memory with an address identical to an address thereof in the second memory, and operating at a third transfer timing to be a time point earlier than a fourth transfer timing determined in accordance with the second transfer period, to have the first shared data as stored in the first memory, stored as the third shared data in the third memory with an address identical to an address thereof in the first memory in accordance with setting information,
   a second transfer element operating as the third shared data is stored by the first transfer, to have this third shared data stored as the fourth shared data in the fourth memory with an address identical to an address thereof in the third memory, and operating as the fourth shared data is stored by the first transfer element, to have this fourth shared data stored as the third shared data in the third memory with an address identical to an address thereof in the fourth memory in accordance with the setting information, and
   a third transfer element operating at the fourth transfer timing, to have the fourth shared data as stored in the fourth memory, stored as the second shared data in the second memory with an address identical to an address thereof in the fourth memory, and operating at the second transfer timing, to have the third shared data as stored in the third memory, stored as the first shared data in the first memory with an address identical to an address thereof in the third memory in accordance with the setting information, wherein
   at least one of the first memory, the second memory, the third memory, and the fourth memory is a non-transitory tangible computer-readable storage medium.

6. The network control system according to claim 5, wherein
   the data transfer system further includes a sixth memory storing therein sets of addresses of the shared data in the first memory, the second memory, the third memory, or the fourth memory and pieces of information on attributes of being shared data in association therewith, as the setting information, and
   the data transfer system has the shared data stored in the first memory, the second memory, the third memory, or the fourth memory in accordance with the setting information stored in the sixth memory.

7. The network control system according to claim 5, further comprising a second data transfer system connected to the first station through the first network and connected to the second station through the second network, having an identical configuration to the data transfer system.

8. The network control system according to claim 6, further comprising a second data transfer system connected to the first station through the first network and connected to the second station through the second network, having an identical configuration to the data transfer system.

9. A network control system for data transfer of shared data shared to be common among control devices, the network control system comprising:
   the control devices controlling equipments as targets thereunder;
   stations controlling data transfer to the control devices; and
   a data transfer system connected to the stations through networks, wherein
   each of the stations have a seventh memory thereof storing a seventh shared data as one of the shared data, and
   the data transfer system includes
   an eighth memory storing an eighth shared data as one of the shared data in shared memory areas thereof corresponding to the stations respectively, a transfer period determiner determining transfer periods for the stations, one each for transfer of the eighth shared data from the data transfer system to one of the stations, a first transfer element operating at a transfer timing determined in accordance with a corresponding transfer period out of the transfer periods with respect to any one station out of the stations, to have the seventh shared data as stored in one of the seventh memories at another station than said one station, stored as the eighth shared data in one of the shared memory areas of the eighth memory corresponding to the other station in accordance with setting information, a second transfer element operating as the eighth shared data is stored in a shared memory area out of the shared memory areas of the eighth memory by the first transfer element, to have this eighth shared data stored, with an address identical to an address thereof in the shared memory area, in another shared memory area out of the shared memory areas of the eighth memory in accordance with the setting information, and a third transfer element operating at a transfer timing determined in accordance with said corresponding transfer period, to have the eighth shared data as stored in a certain one of the shared memory areas of the eighth memory, stored as the seventh shared data in one of the seventh memories at said one station, with an address identical to an address thereof in the certain shared memory area of the eighth memory in accordance with the setting information, wherein at least one of the seventh memory and the eighth memory is a non-transitory tangible computer-readable storage medium.

10. The network control system according to claim 9, wherein the data transfer system further includes a tenth memory storing therein sets of addresses of the shared data in one of the seventh memories or the eighth memory and pieces of information on attributes of being shared data in association therewith, as the setting information, and the data transfer system has the shared data stored in the one of the seventh memories or the eighth memory in accordance with the setting information stored in the tenth memory.

11. The network control system according to claim 9, further comprising a second data transfer system connected to the stations through networks, having an identical configuration to the data transfer system.

12. The network control system according to claim 10, further comprising a second data transfer system connected to the stations through networks, having an identical configuration to the data transfer system.

13. A network control system for data transfer of shared data shared to be common among control devices, the network control system comprising:

the control devices controlling equipments as targets thereunder;

stations controlling data transfer to the control devices; and a data transfer system connected to the stations through networks, wherein each of the stations have a seventh memory thereof storing a seventh shared data as one of the shared data for each of orders of priority in transfer thereof between the data transfer system and the stations, and the data transfer system includes an eighth memory storing an eighth shared data as one of the shared data in shared memory areas thereof corresponding to the stations respectively, for each of orders of priority in transfer thereof between the data transfer system and the stations, a ninth memory storing therein sets of orders of priority in transfer of the shared data between the data transfer system and the stations, as priority order information, a transfer period determiner reading pieces of the priority order information from the ninth memory, and operating on a basis of this priority order information to determine transfer periods for the stations, one each for transfer of the eighth shared data from the data transfer system to one of the stations, a first transfer element operating at a transfer timing determined in accordance with a corresponding transfer period out of the transfer periods with respect to any one station out of the stations, to have the seventh shared data as stored in one of the seventh memories at another station than said one station, stored as the eighth shared data in one of the shared memory areas of the eighth memory corresponding to the other station in accordance with setting information, a second transfer element operating as the eighth shared data is stored in a shared memory area out of the shared memory areas of the eighth memory by the first transfer element, to have this eighth shared data stored, with an address identical to an address thereof in the shared memory area, in another shared memory area out of the shared memory areas of the eighth memory in accordance with the setting information, and a third transfer element operating at a transfer timing determined in accordance with said corresponding transfer period, to have the eighth shared data as stored in a certain one of the shared memory areas of the eighth memory, stored as the seventh shared data in one of the seventh memories at said one station, with an address identical to an address thereof in the certain shared memory area of the eighth memory in accordance with the setting information, wherein at least one of the seventh memory, the eighth memory, and the ninth memory is a non-transitory tangible computer-readable storage medium.

14. The network control system according to claim 13, wherein the data transfer system further includes a tenth memory storing therein sets of addresses of the shared data in one of the seventh memories or the eighth memory and pieces of information on attributes of being shared data in association therewith, as the setting information, and the data transfer system has the shared data stored in the one of the seventh memories or the eighth memory in accordance with the setting information stored in the tenth memory.

15. The network control system according to claim 13, further comprising a second data transfer system connected to the stations through networks, having an identical configuration to the data transfer system.

16. The network control system according to claim 14, further comprising a second data transfer system connected to the stations through networks, having an identical configuration to the data transfer system.

* * * * *